United States Patent
Friedman et al.

(12)

(10) Patent No.: US 7,950,268 B2
(45) Date of Patent: *May 31, 2011

(54) VEHICLE ROLLOVER TEST FIXTURE

(75) Inventors: Donald Friedman, Santa Barbara, CA (US); Acen Jordan, Carmel, CA (US)

(73) Assignee: Safety Testing International, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/718,855

(22) Filed: Mar. 5, 2010

(65) Prior Publication Data
US 2010/0192667 A1    Aug. 5, 2010

Related U.S. Application Data

(63) Continuation-in-part of application No. 12/136,708, filed on Jun. 10, 2008, now Pat. No. 7,775,082.

(51) Int. Cl.
*G01N 3/00* (2006.01)
*G01M 17/00* (2006.01)

(52) U.S. Cl. ............... 73/12.06; 73/12.13; 73/865.3

(58) Field of Classification Search ......... 73/12.06, 73/865.3, 865.6
See application file for complete search history.

(56) References Cited

U.S. PATENT DOCUMENTS

| | | | | |
|---|---|---|---|---|
| 2,115,841 A * | 5/1938 | Case | ................. | 73/12.06 |
| 6,651,482 B1 * | 11/2003 | Moffatt et al. | ............... | 73/12.12 |
| 7,373,801 B2 * | 5/2008 | Friedman et al. | ............ | 73/12.06 |
| 7,775,082 B2 * | 8/2010 | Friedman et al. | ............ | 73/12.06 |
| 2006/0207353 A1 * | 9/2006 | McCoy | ................ | 73/865.6 |

OTHER PUBLICATIONS

Batzer S. A., Hooker R. M. "Dynamic Roof Crush Intrusion in Inverted Drop Testing" 19th International Safety Conference on the Enhanced Safety Vehicles, Paper No. 05-0146-W, Washington, D. C. Jun. 6-9, 2005.*
Federal Motor Vehicle Safety Standards; Roof Crush Resistance. 49 CFR Part 571. Accessed online on Jan. 30, 2008.*
Friedman K., Gaston F., Bish J. Experimental comparison of inverted dummy and living human drop tests. 1999 Bioengineering Conference.*

* cited by examiner

*Primary Examiner* — Lisa M Caputo
*Assistant Examiner* — Punam Roy
(74) *Attorney, Agent, or Firm* — Felix L. Fischer

(57) ABSTRACT

A test fixture for rollover crash testing of a test vehicle onto a movable sled surface employs a cradle to support and rotate the test vehicle. A suspension assembly is attached to each end of the cradle for vertically supporting and dropping the cradle. A gantry has a cross beam supported by a first telescoping column for support of a first of the suspension assemblies and translationally supported by a second telescoping column for support of a second of the suspension assemblies to position and releasably hold the suspension assembly. Roll control arms rotate the cradle and a trigger assembly releases the cradle and test vehicle from the cross beam for contact within a drop impact zone on the contact surface of the sled. A brake assembly then arrests vertical motion of the cradle.

15 Claims, 26 Drawing Sheets

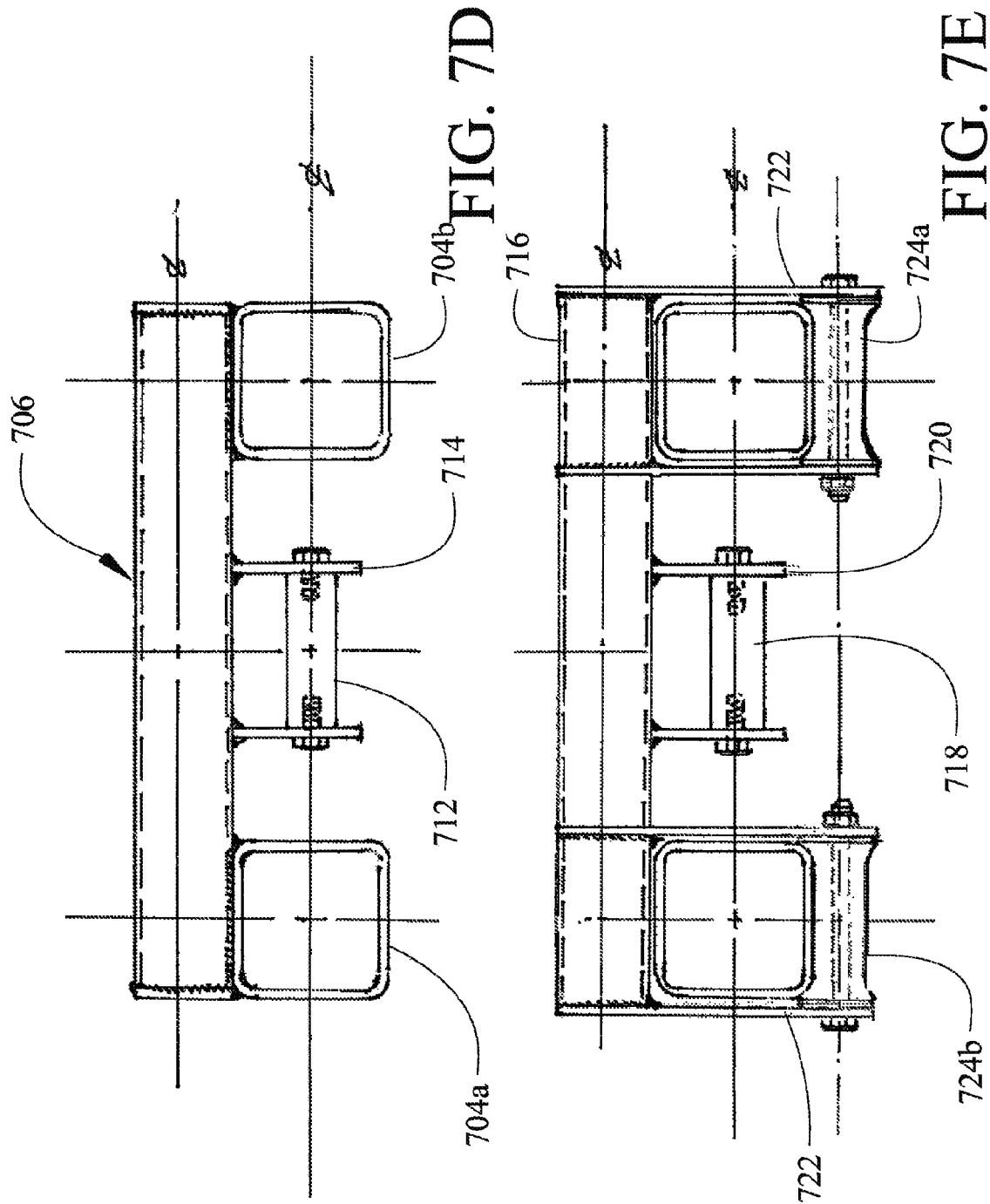

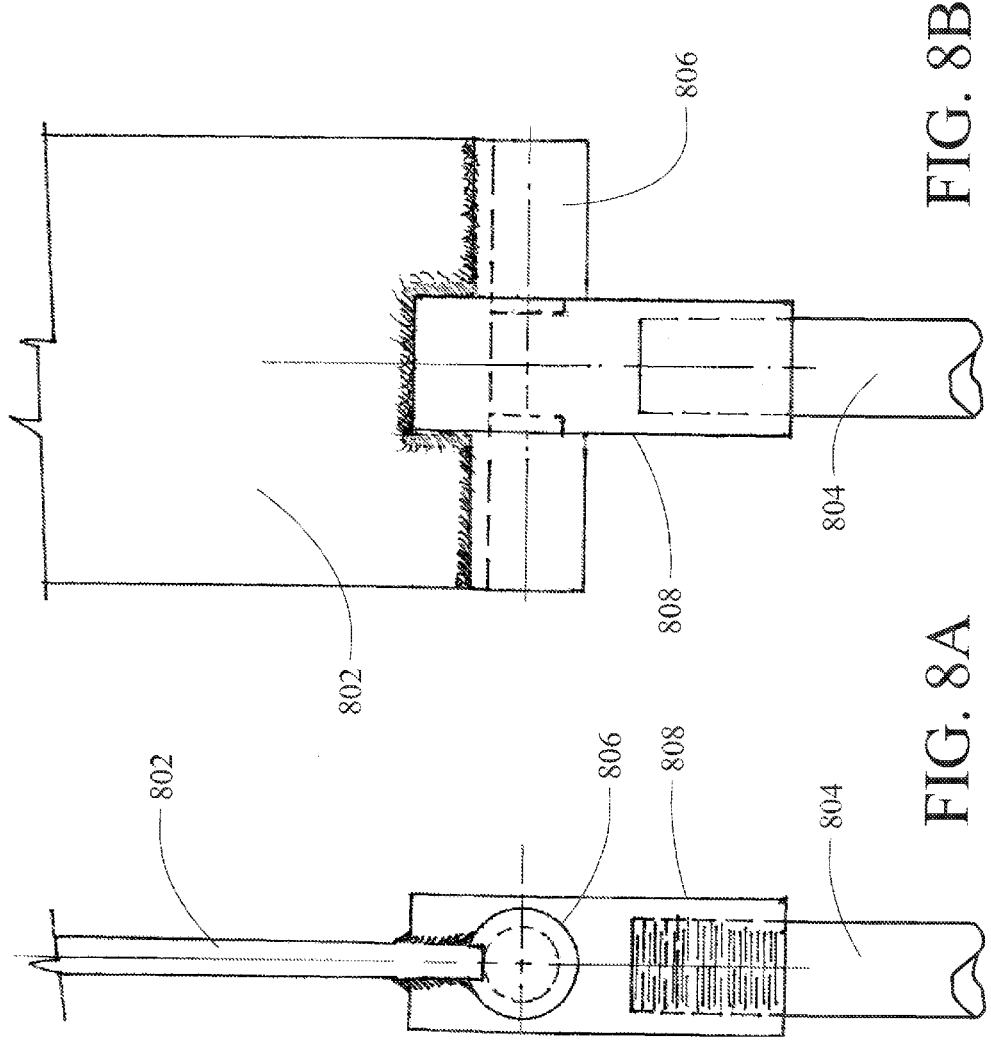

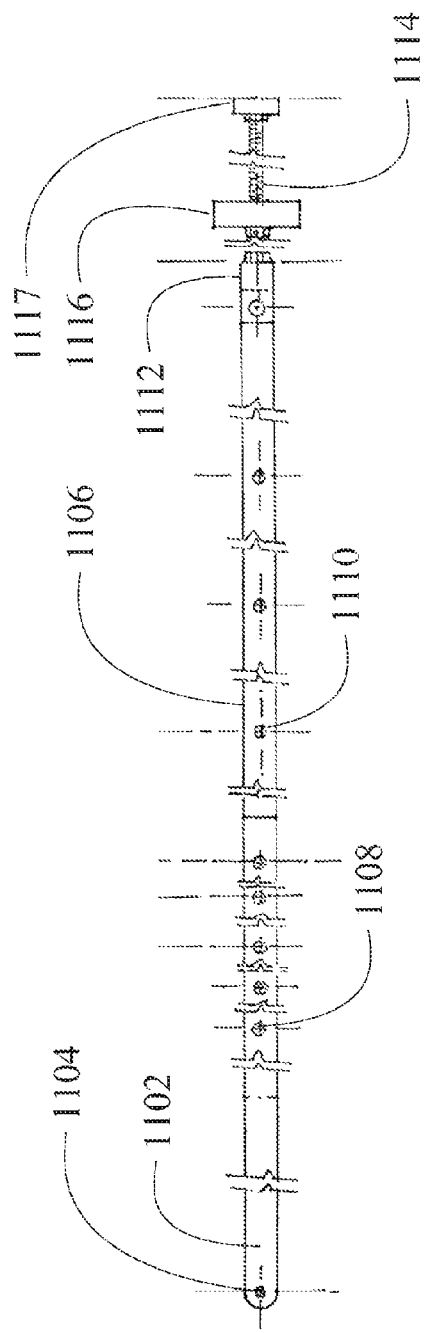
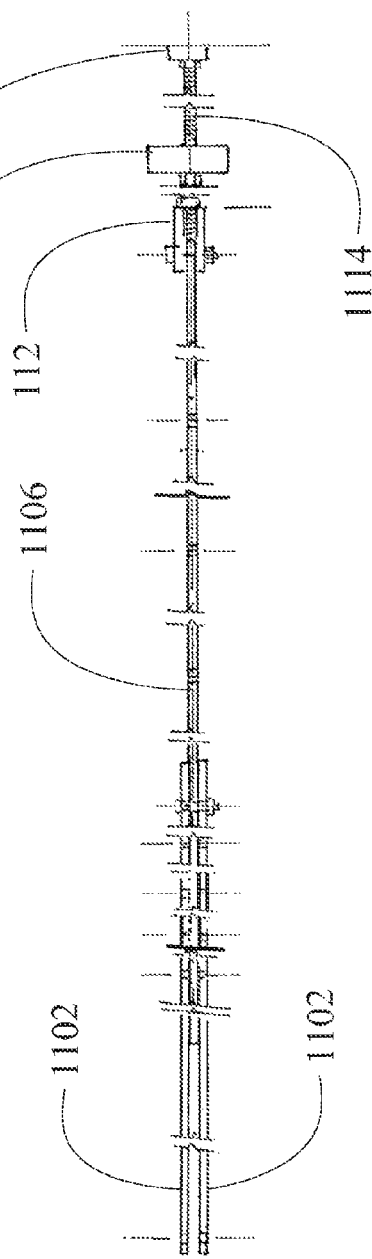
FIG. 11A
FIG. 11B

VEHICLE ROLLOVER TEST FIXTURE

REFERENCE TO RELATED APPLICATIONS

This application is a continuation-in-part of application Ser. No. 12/136,708 filed on Jun. 10, 2008 entitled Vehicle Rollover Test Fixture and having common inventors and a common assignee with the present application, the disclosure of which is incorporated herein by reference as though fully set forth.

BACKGROUND

1. Field

This invention relates to an automotive vehicle test fixture. In particular, the invention relates specifically to a fixture to conduct dynamic, repeatable, controlled destructive rollover impact tests of both full scale vehicles and representations to evaluate strength and occupant protection characteristics of the vehicle roof and other vehicle components. The invention provides precise control of initial test parameters including drop height, contact roll rate, contact roll angle, pitch angle, post contact freefall height with improved vehicle roll control, drop initiation and post test arrest. In addition, the invention enables the measurement of dynamic forces and orientations between vehicle and road bed and enables multiple tests to be conducted and evaluated on an isolated singular roll-by-roll basis.

2. Description of Prior Art

Rollovers have been and continue to be a significant cause of occupant fatalities and serious injuries. To date, the experiments to determine vehicle performance have been criticized as unrepeatable and, thus, inappropriate for vehicle or component design and testing and/or compliance type testing. Various other test fixtures have been developed that addresses some of these issues, but require a large infrastructure to run and do not fully control the vehicle after the first impact and during the test (reference: U.S. Pat. No. 6,651,482). Another device (reference U.S. Pat. No. 6,256,601) articulates about a pivot but does not provide a full rollover capability, nor does it provide a means to simulate a roll about the true roll axis of a vehicle. In addition, none of the other test methods allow for the direct measurement of the loads applied to the vehicle, which are important to evaluating and understanding the dynamics of a rollover event. This subject invention resolves these issues in a manner that will allow effective repeatable vehicle testing. Vehicle testing in the rollover regime is crucial to understanding interactions between the occupant and the vehicle's structures, restraints, glazing, etc. A better knowledge of these parameters will allow for improved vehicle designs and a safer vehicle fleet.

Previous testing to determine vehicle performance and vehicle to occupant interactions in rollover conditions uses various types of tests including dropping a rotating vehicle, launching a vehicle from a dolly, launching a vehicle from a ramp or otherwise tripping a vehicle to initiate a roll. The major drawback of these tests is the unrepeatable nature of the testing. While these tests will allow insight into vehicle performance, they do not allow a study of vehicle and component performance during an impact that can be exactly repeated to determine changes in vehicle structure or geometry through repeated tests. In particular, earlier test methods do not result in consistent impacts due to variations in tire to dolly or tire to road impacts before the roof structure interaction or are not controlled after the roof impacts. By controlling the vehicle both before and after the roof impacts, performance during an impact can be isolated and examined in detail.

U.S. Pat. No. 6,651,482 describes an alternate method of rollover testing. The method described in that patent is considerably different from the invention discussed herein. These differences lead to several shortcomings in the previous methodology including the inability to measure the direct forces on the roof of the vehicle, the inability to control the vehicle after the desired roof contacts, the artificial positioning of anthropomorphic crash test dummies if included, the inability of the system to directly determine the roof crush from the desired impact, the inability to evaluate damage on a per roll and/or cumulative basis.

U.S. Pat. No. 6,256,601 describes a rollover test sled designed to simulate the behavior of vehicle occupant and safety systems in a rollover accident. The method described differs significantly from the invention presented herein since the test does not provide the means to rotate a test vehicle or dummies about a roll axis. The fixture described also does not provide the means to rotate the test vehicle for the purposes to measure and evaluate vehicle structural integrity.

Prior art systems are not presently able to provide control of the vehicle in pitch and yaw at the initiation of and during test sequences. The prior art systems additionally very large scale devices requiring large areas for set up and operation, typically amounting to outdoor tracks or very large building facilities to accommodate their size.

U.S. application Ser. No. 11/380,862 entitled Vehicle Rollover Crash Test Fixture now U.S. Pat. No. 7,373,801 copending with the parent application hereof and having common inventors with the present application provides a test fixture for repeatable dynamic vehicle rollover testing. The invention disclosed therein provides a moving sled with a contact surface simulating a roadway or other appropriate medium. A cradle to suspend a test vehicle is equipped to rotate and release the vehicle onto the contact surface to repeatably simulate a rollover condition. While coupled motion of the sled and rotation of the vehicle prior to impact provide repeatable test results with highly accurate simulation, the structural and system requirements for creating and coordinating the moving sled contact zone are complex and costly. It is therefore desirable to provide a rollover test fixture with the capabilities of the prior system but simplified to reduce cost, complexity and simulation error as well as ease of setup and safety of operating personnel.

The present invention addresses these issues and provides a simplified and improved dynamic, repeatable vehicle rollover test fixture which can be accommodated in a laboratory environment with minimal space requirements to allow consolidation of instrumentation as well as further contribute to controlled environment and operating conditions for repeatable test results.

SUMMARY

A test fixture for rollover crash testing of a test vehicle onto a movable sled surface employs a cradle to support and rotate the test vehicle. A suspension assembly is attached to each end of the cradle for vertically supporting and dropping the cradle. A gantry has a cross beam supported by a first telescoping column for support of a first of the suspension assemblies and translationally supported by a second telescoping column for support of a second of the suspension assemblies to position and releasably hold the suspension assembly. Roll control arms rotate the cradle and a trigger assembly releases the cradle and test vehicle from the cross beam for contact within a drop impact zone on the contact surface of the sled. A brake assembly then arrests vertical motion of the cradle.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIG. 7D is an end section view of the fixed cross mount in the cross beam assembly;

FIG. 7E is an end section view of the slide mount assembly of the cross beam assembly:

FIG. 8A is a front view of the suspension assembly;

FIG. 8B is a side view of the suspension assembly;

FIG. 11A is a front view of the trigger linkage assembly;

FIG. 11B is a top view of the trigger linkage assembly;

DETAILED DESCRIPTION

Figure 1:
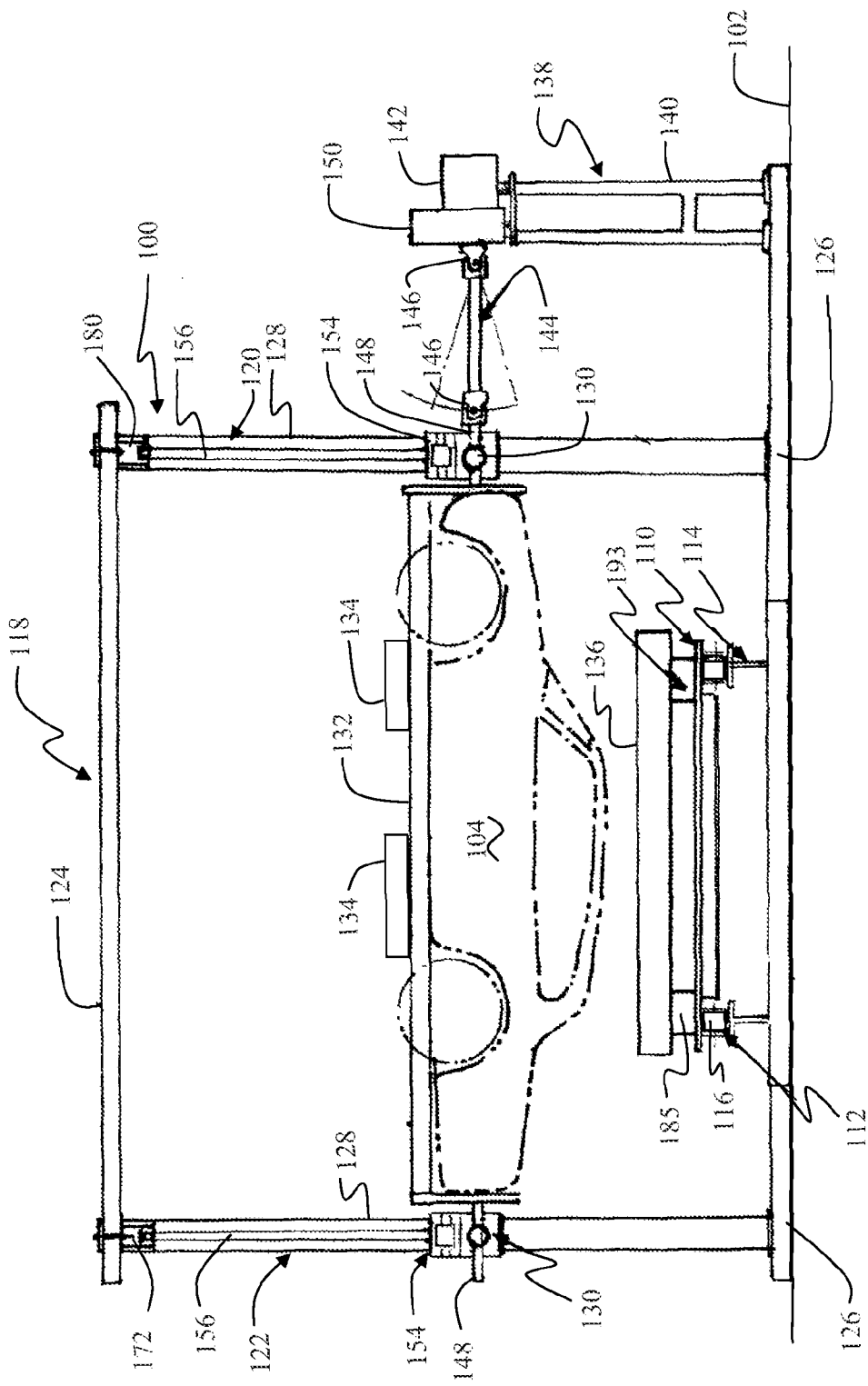
FIG. 1 is a front view of the rollover fixture showing the major components.
Figure 2:
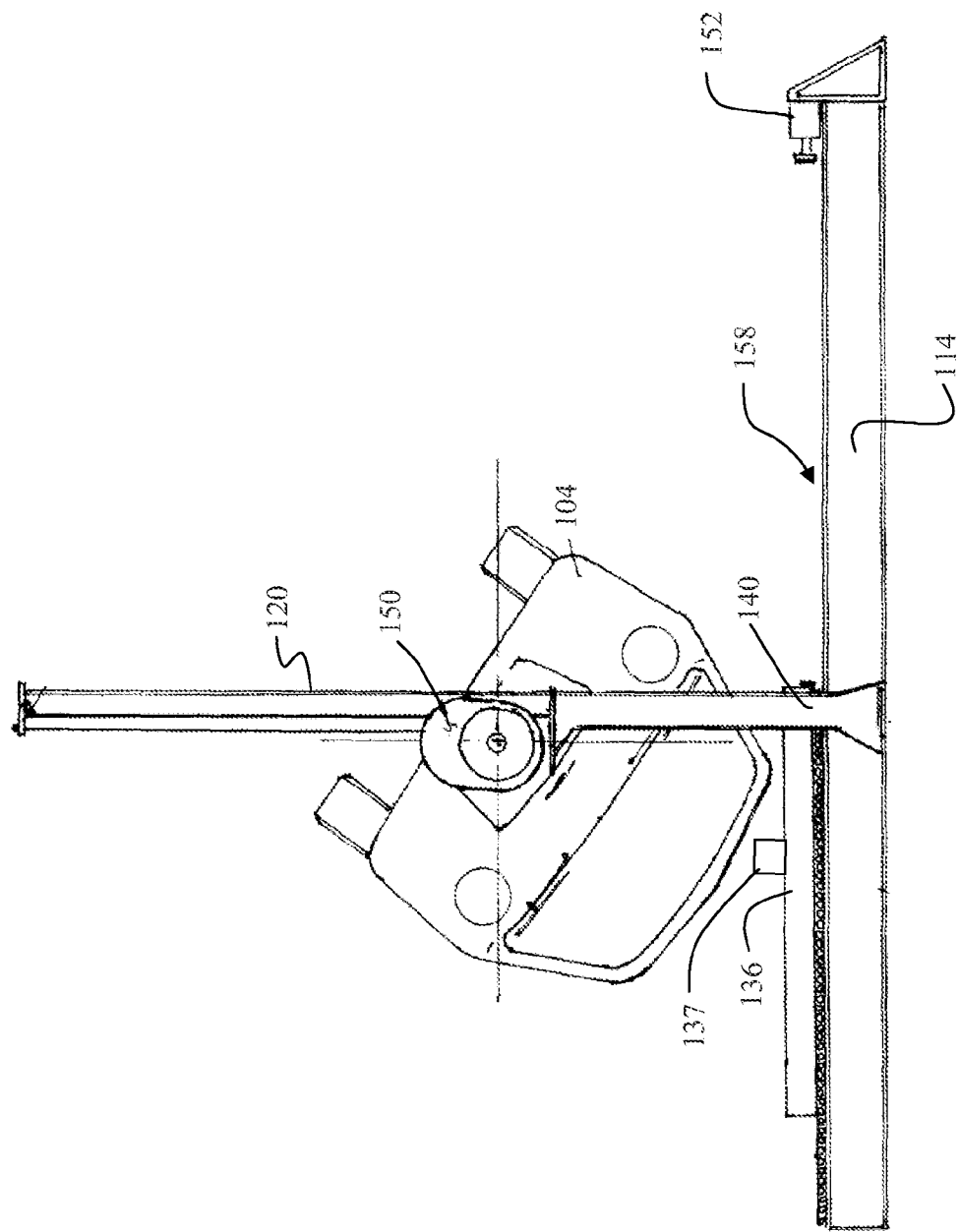
FIG. 2 is a side view of the rollover fixture of FIG. 1.

An exemplary embodiment of the structure of the present invention is illustrated in FIGS. 1 and 2. The test fixture 100 incorporates a sled 110 supported by a bearing system 112 having guide rails 114 and caged roller bearings 116 for the embodiment shown. Drop tower assembly 118 includes a front drop column 120 and a rear drop column 122 connected overhead by a cross beam 124. The drop tower assembly 118 straddles the sled guide rails 114 and the drop columns are mounted to yaw adjustment guide plates 126 that are pivotably fastened to a floor 102 of the test area. The angular orientation of the drop tower assembly relative to the sled guide rails therefore sets the yaw position of the test vehicle. The drop columns 120 and 122 each support vertical guide bearings 128. Runner assemblies 130 which support and couple to a vehicle cradle 132 ride on the guide bearings for vertical motion of the cradle. The vehicle cradle is fitted with various brackets to facilitate mounting of various models of full size test vehicles 104 or test bucks. For the exemplary cradle shown in this embodiment, the attachment of the vehicle to the cradle is accomplished by removing the bumpers of the vehicle and attaching the cradle cross members to the bumper attachment structure on the vehicle. In alternative embodiments, the cradle may attach to the wheels or suspension system of the test vehicle allowing interaction of the vehicle suspension system in the test. Cradle ballast weights 134 may be also affixed to the vehicle or cradle in order to compensate or adjust the vehicle moments of inertia.

The sled is movable on the bearing system along the guide rails in reaction to the impact of the vehicle. For the embodiment shown in the drawings, a roadway surface 136 is mounted to the upward face of the sled in order to simulate a road condition for impact with the vehicle. Various road surface materials are employed to simulate various real road conditions including Macadam and concrete. In alternative embodiments, various other surface features are mounted to the sled structure such as curb elements 137 as shown in FIG. 2 for impact studies.

With the sled simulating the roadway for impact of the vehicle, rotation of the vehicle cradle establishes the simulation parameters for impact of the vertically descending vehicle with the roadway. A rotation drive assembly 138 located adjacent the front drop column provides a rotation drive motor support frame 140 that supports a rotation drive gear motor 142. A rotation drive support shaft 144 couples the rotation drive motor and the vehicle cradle. The drive support shaft incorporates universal joints 146 that provide angular alignment between the drive motor and the vehicle cradle. Slide rods 148 couple the vehicle cradle to the runner assemblies. A clutch assembly 150 connecting the gear motor to the drive support shaft allows the motor to be disengaged during the impact sequence. The sled reacts to the impact of the rotating vehicle, moving along the bearing assembly to allow the rolling motion of the vehicle to continue while remaining supported by the cradle on the vertical columns.

For the embodiment shown, a sled decelerator 152 located at the end of the sled guide rails 114 is provided to beneficially decelerate and stop the sled in a controlled manner at the end of its travel in reaction to the rotational inertia of the impacting vehicle.

At the completion of the roll-over impact event, the car body or buck is arrested to prevent damage to the support elements of the fixture or the sled or drive system through unwanted contact. To accommodate this requirement, a vertical brake assembly 154, best seen in FIG. 1, is provided as a portion of the vertical runner assembly. The vertical brake engages a rail element 156 on the drop towers on each side of fixture. For the embodiment shown in the drawings the vertical brake is a disc brake assembly acting on the rail. The brake is actuated by a sensing element. In exemplary embodiments, a contact switch 158 on the guide rail senses motion of the sled and actuates the brake. Alternatively, event completion is determined by the angle of rotation of the vehicle under test or predetermined timing and sensing of the completed event is accomplished based on the rotation angle of the support shaft elements in the vertical runner assemblies. An index pin on the slide rod which engages a micro switch upon rotation through a predetermined arc or an angular rotation sensor on the axle or the rotation drive pulley is employed as the event completion sensor.

Figure 3:
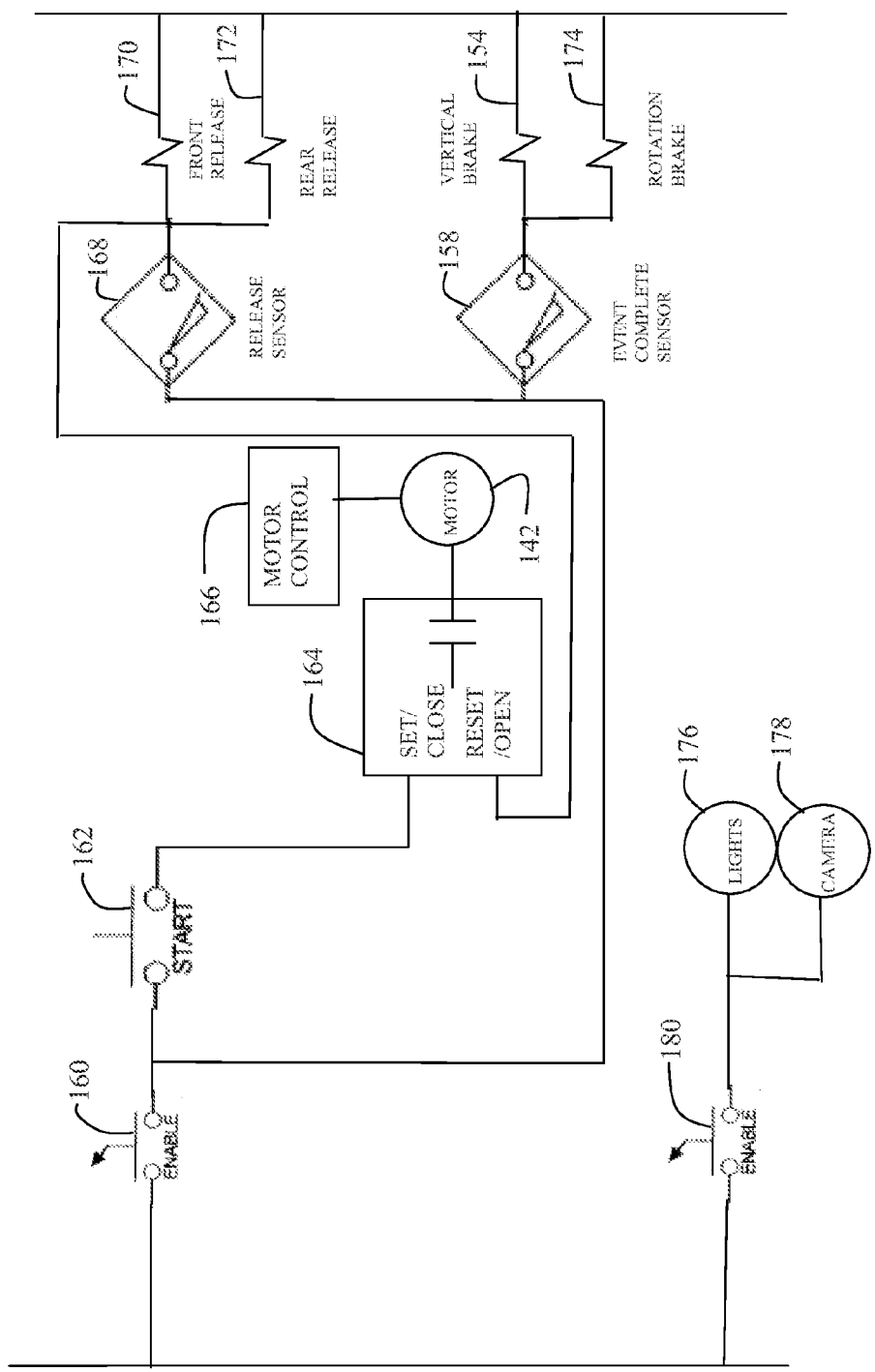
FIG. 3 diagrams an embodiment of an electrical control system used to manually start the rollover test process and to enable actuation of vehicle drop.

FIG. 3 is a diagram of a simplified electrical control system. Since human safety is paramount concern while conducting vehicle testing, system power is enabled by a keyswitch 160. A start switch 162 is manually actuated to initiate the test sequence that causes control relay 164 to close and thereby energizing the motor 142 under the control of motor control circuit 166. Upon energizing the motor control relay, rotation of the cradle is initiated. Control circuit 166 controls current to the gear motor to achieve the desired rotational velocity within a predetermined rotation angle for drop. As the cradle passes a rotation angle sensor 168, the front drop actuator 170 and rear drop actuator 172 are energized to release thereby allowing the vehicle cradle 132 and the subject test vehicle 104 it contains to drop. In the embodiment shown, power is removed from the gear motor responsive to the rotation angle sensor by resetting (opening) the motor power relay. Upon actuation of the event complete switch 158 the vertical brake assemblies 154 are activated and a rotation brake 174 is activated to stop rotation of the cradle. As shown in FIG. 3, additional test equipment features such as illumination lights 176 for cameras 178 are controlled by a switch 180 located on the operator controls.

Figure 4:
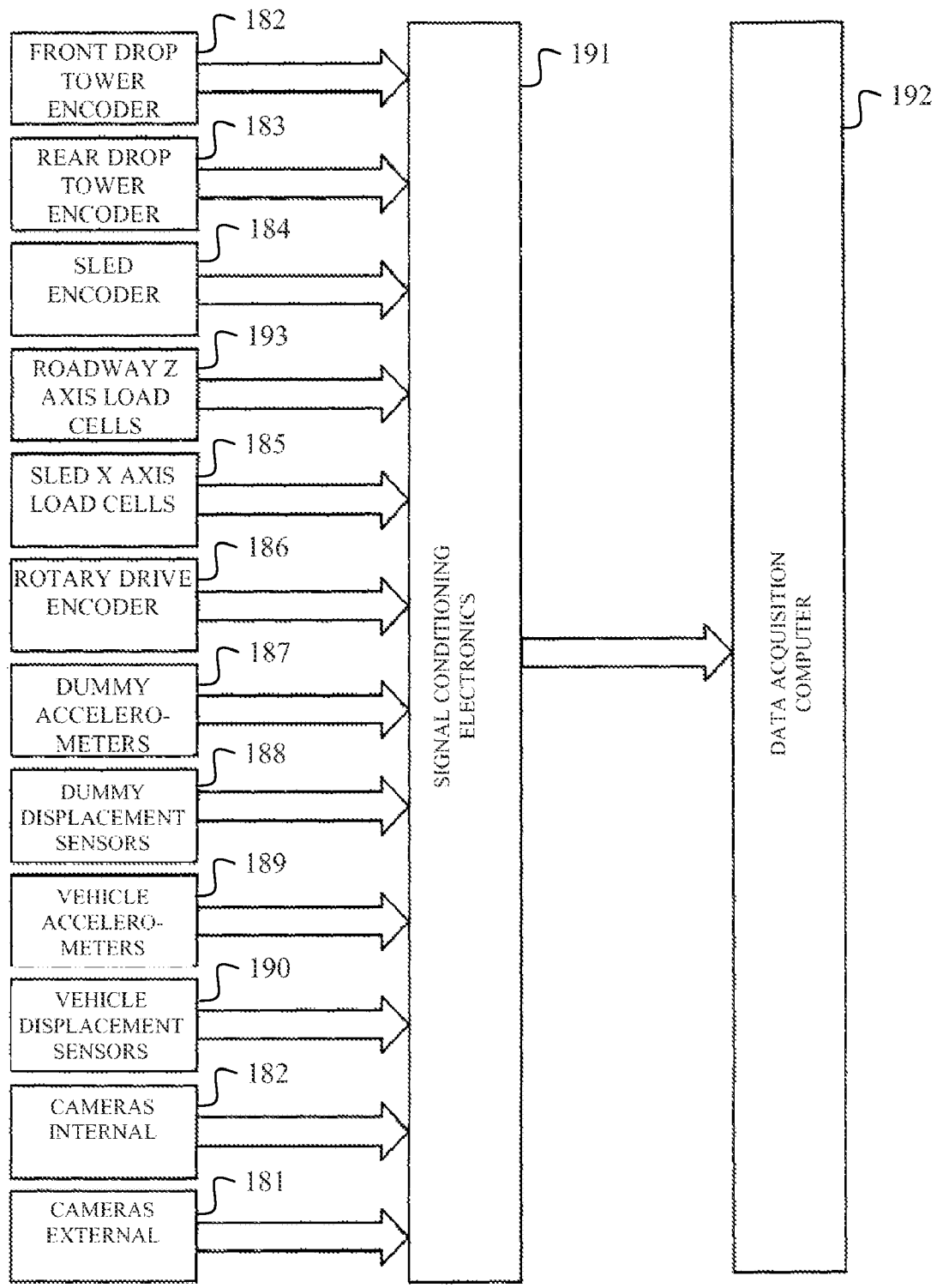
FIG. 4 diagrams an embodiment of a data acquisition system used to monitor and record dynamic physical responses of the vehicle, roadway and dummies within the vehicle.

As shown in FIG. 4, a suite of instrumentation sensors is incorporated to measure and record the dynamic physical responses of the vehicle during the test. Sensors included in a preferred embodiment of the invention are: encoders 182 and 183 respectively mounted to the front and rear drop columns 120 and 122 for recording vertical motion of the cradle and supported vehicle; encoder 184 is used to monitor the X axis linear position to derive speed and acceleration of sled 110; load cells 193 arranged between the roadway surface and the sled to monitor Z-axis impact forces imposed by the test vehicle; load cells 185 arranged between the roadway surface and the sled to monitor X-axis impact forces imposed by the test vehicle; encoder 186 to monitor the roll orientation of the test vehicle; accelerometers 187 to monitor impact forces imposed upon a test dummy; sensors 188 to monitor displacements imposed upon a test dummy during the test; accelerometers 189 to monitor impact forces imposed upon the test vehicle; sensors 190 to measure displacements imposed upon the test vehicle; cameras 182 mounted about the rollover apparatus to monitor various external aspects of the test vehicle; and cameras 183 mounted within the test vehicle to monitor various internal aspects including roof crush intrusion and dummy positions during the test.

As shown in FIG. 4, the suite of sensors as previously described are preferentially input to signal conditioning electronics 191 and digitized for input to a data acquisition computer 192. Once digitized, the collected data is saved, analyzed and formatted for various studies and reports.

Figure 5:
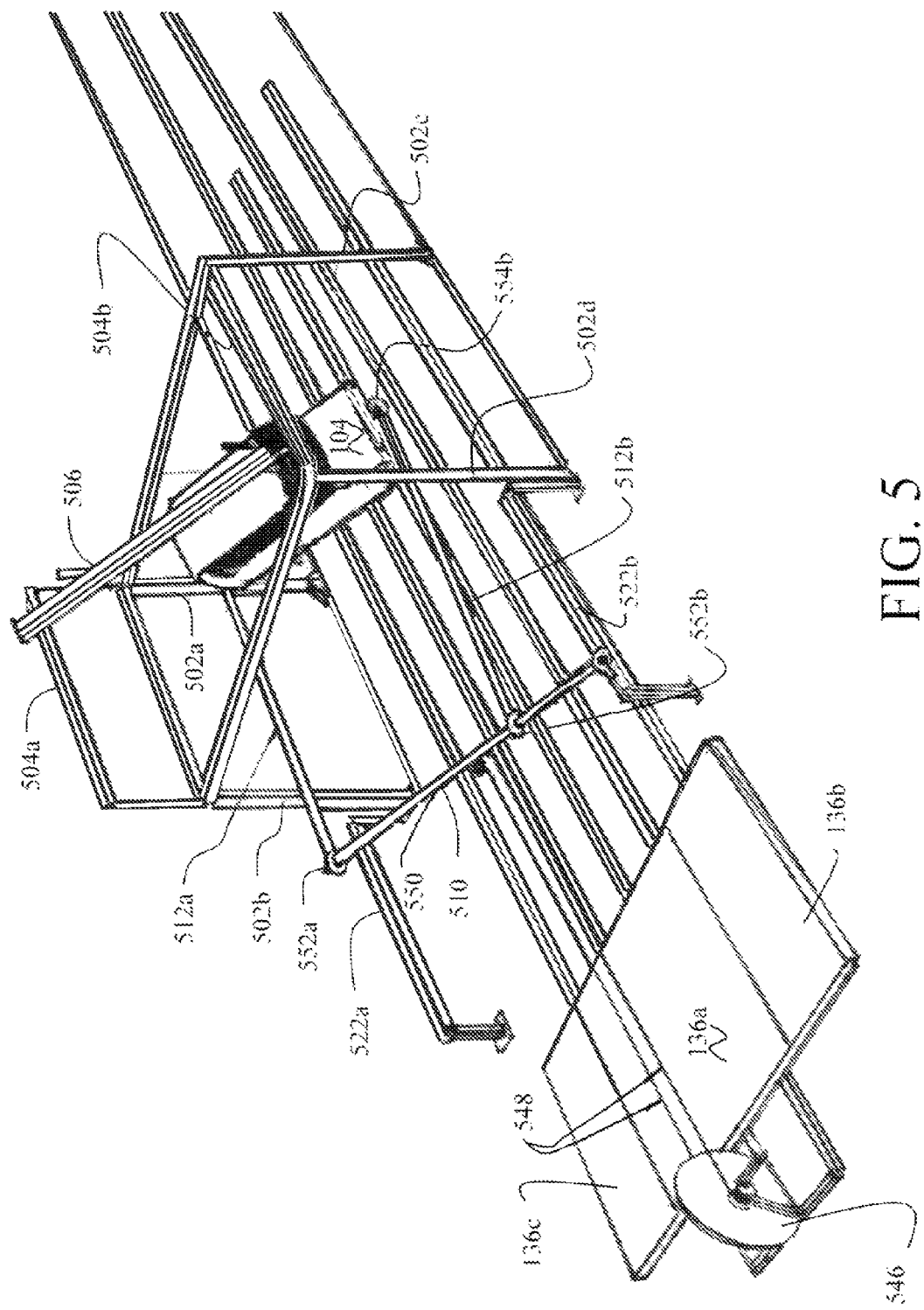
FIG. 5 is a front isometric view of an alternative embodiment of the invention with a four post support structure.

An alternative embodiment of the present invention which employs an four post structural support arrangement for simplified operation of the system in positioning the vehicle for pitch and yaw control in the test is shown in FIG. 5. A four post structure having vertical supports 502a-502d on which horizontal support beams 504a and 504b are mounted provides flexibility in positioning a suspension beam 506 from which the test vehicle 104 is suspended with a cradle 508. By adjusting the elevation of the vertical supports, the horizontal support beams provide an angled mounting of the suspension beam to create a desired pitch angle of the vehicle mounted in the cradle. Additionally, movement of the suspension beam mounting along the horizontal support beams creates an adjustable yaw angle for the vehicle. A control beam 510 with opposing control arms 512a and 512b extending for engagement of the cradle maintain the yaw angle of the cradle and supported vehicle during the drop. Control beam 510 is carried by structural supports on horizontal beam elements 522a and 522b.

For the embodiment shown in FIG. 5, the sled incorporates three separable structures center 136a, right wing 136b and left wing 136c. The sled may be operated with all three elements interconnected to obtain data for all potential contact points, i.e. the roof and support pillars, front hood/fender and rear contact. Operation of the center only allows data gathering with respect to the strength of the roof and support pillars only, for example, with the right and left wings not connected and therefore not providing any contact surface for the nose and tail of the test vehicle. Operation of the center with one or the other of the wings allows data gathering for the nose and tail structures.

Rotation of the cradle is imparted in the alternative embodiment using a gear motor or similar drive element as previously described mounted in one or both of the rotational support bosses. Alternatively, a motor driven drive pulley 546 engages a cable 548 which runs a rotational sleeve 550 on the control beam to pulleys 552a and 552b at the attachment of the control arms to reaction pulleys (exemplified by element 554a) mounted on the rotational support bosses.

Alternatively, the cable provided for the pulley can be interconnected to the sled and pneumatic power provided for driving motion of the sled. Motion of the sled thereby imparts rotational motion to the cradle. By attachment of the cable to pulleys 552a and 552b using end beads captured in slots in the pulley wall, the cable is released from the pulley at the desired rotation providing free rotation of the cradle at the actual impact.

Figure 6:
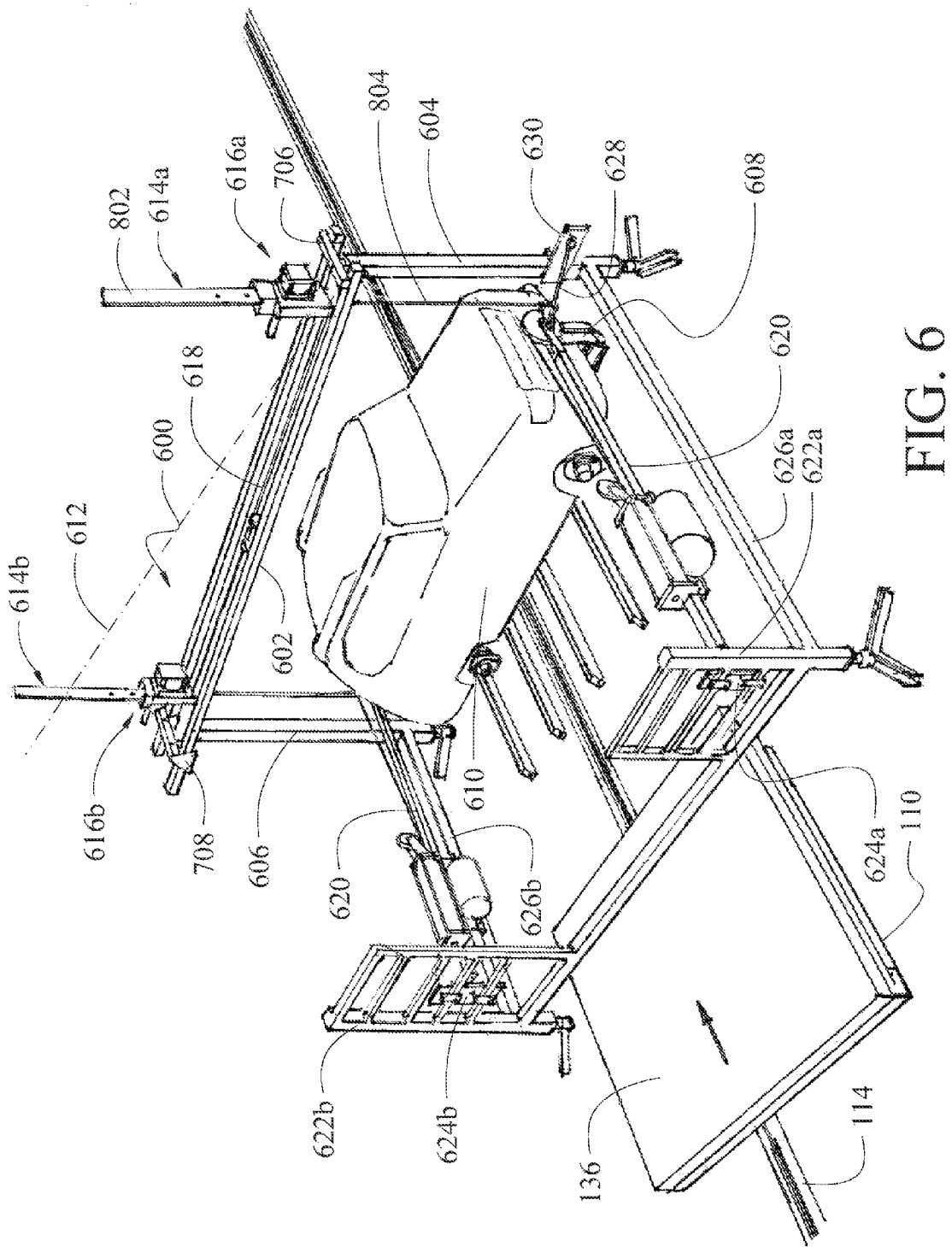
FIG. 6 is an isometric view of a second alternative embodiment of the invention with simplified and improved release and breaking devices with compact structural support.
Figure 7A:
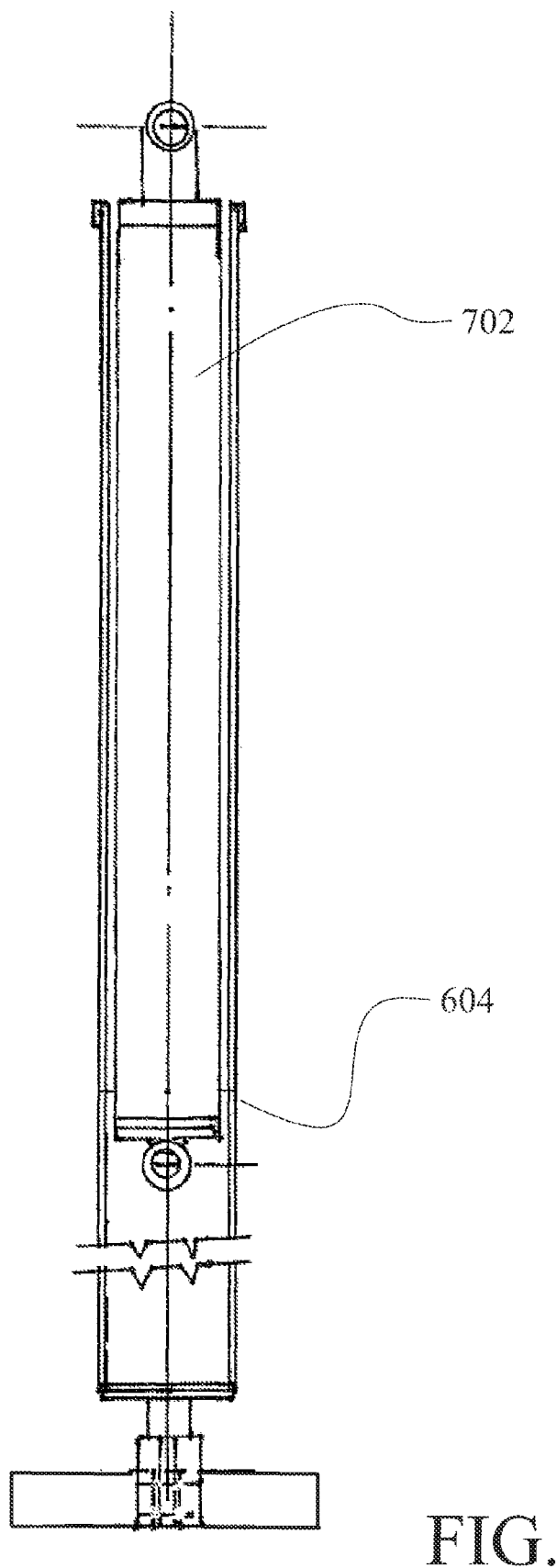
FIG. 7A is a section view of one column demonstrating the telescoping cylindrical ram.

FIG. 6 shows another alternative embodiment which employs a compact support structure having a gantry 600. As in prior embodiments, the gantry is positionable over a movable sled 110 having a road bed 136 for contact by the test article. A cross beam assembly 602 is supported in the gantry by a first column 604 and a second column 606. Each of the columns incorporates a hydraulic cylinder 702 as shown in FIG. 7A for telescoping placement of the cross beam assembly. Differential extension of the hydraulic cylinders allows a pitch angle to be imposed on a cradle 608 which carries a test article, vehicle 610, as shown in FIG. 6. Beam axis 612 shows an exemplary 15 degree pitch angle which may be assumed by the cross beam assembly. For the exemplary embodiment shown, the first column incorporates a hydraulic cylinder having a 0.91 m extension range while the second column incorporates a hydraulic cylinder having a 2.1 m vertical range to obtain up to 15 degrees of pre set pitch for the test article. The cradle is suspended from the cross beam assembly as will be described in greater detail subsequently. In the present embodiment, yaw of the test article may be introduced by angular positioning of the entire gantry with respect to the track 114 on which the sled is movable.

Roll and translational control of the cradle and test article are provided through roll control arm assemblies 620 which will be described in greater detail subsequently. One roll control arm assembly is supported from first reaction structure 622a having tubular structure to provide for the mounting of a ball joint at the distal end of the control arm using flat bracket 624a. To accommodate the various roll heights and lengths of test articles the mounting tubes for the flat bracket span an available area of approximately 1.3 m wide and 0.75 to 1.75 m high. A second roll control arm assembly is supported from a second reaction structure 622b having a similar configuration to the first reaction structure but with height variability for mounting tubes for flat bracket 624*b* from approximately 0.75 to 2.7 m in order to accommodate test articles in initially pitched (up to 15 degrees) position. The reaction structures are spaced from the first and second columns by lateral structural members 626*a* and 626*b* to complete the gantry structure. Casters, feet or other mounting structures are employed at the lower end of the columns and reaction structures to support the gantry and provide for positioning with respect to the sled and track.

Figure 7B:
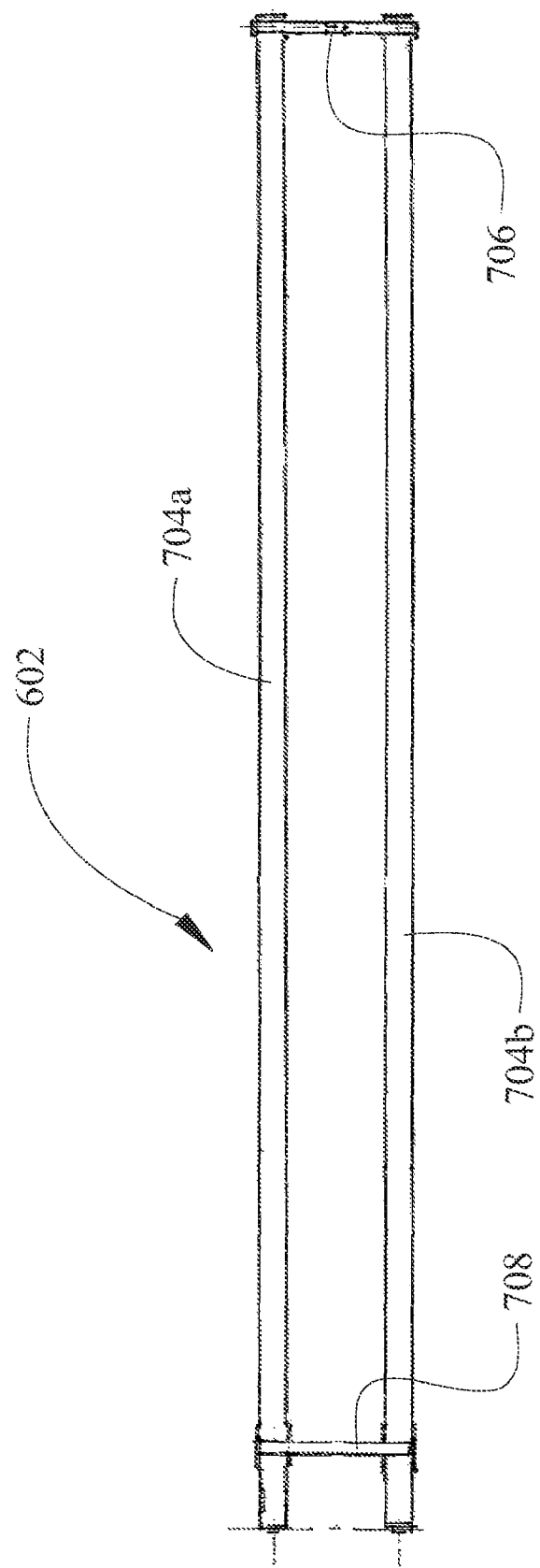
FIG. 7B is a top view of the cross beam assembly.
Figure 7C:
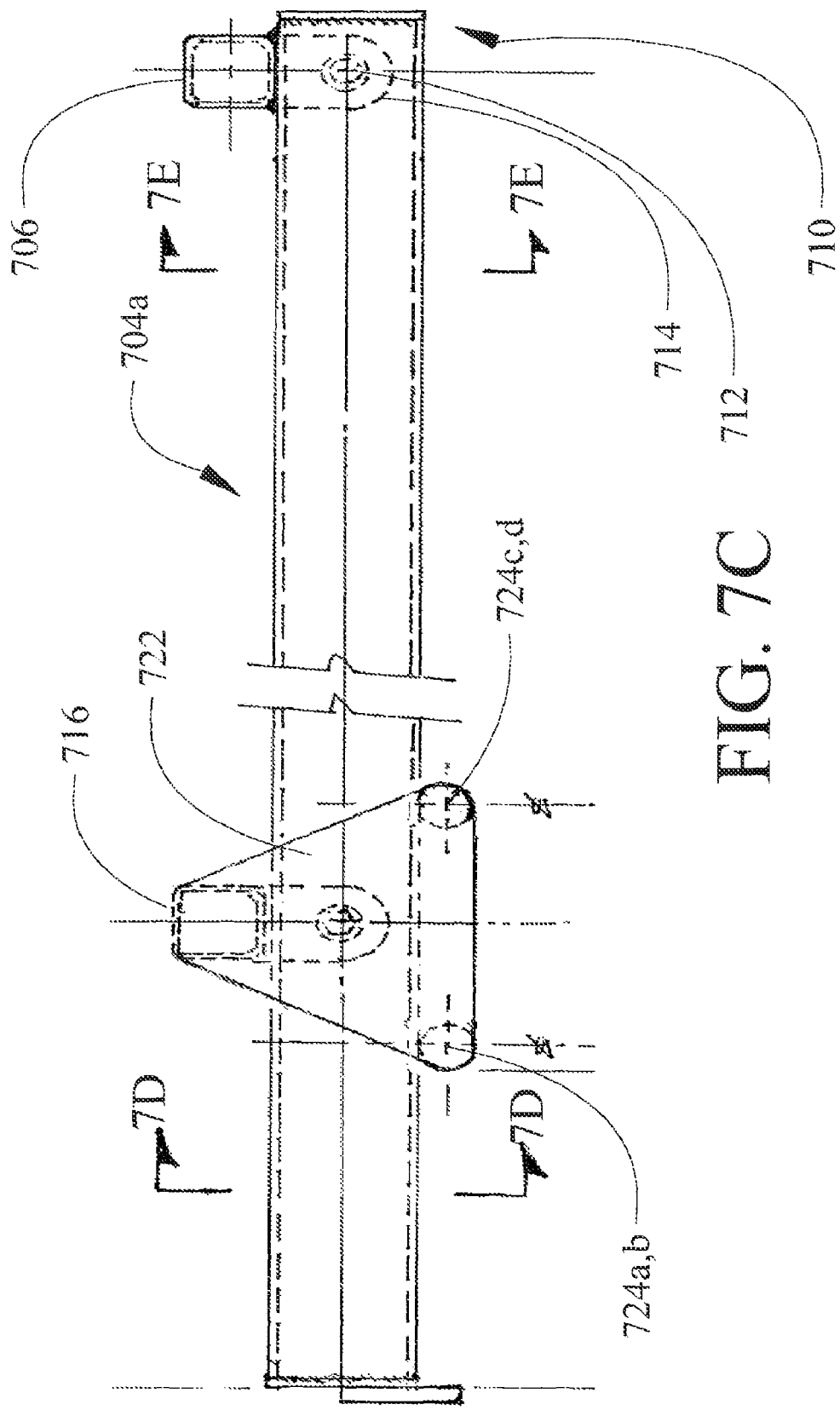
FIG. 7C is a side view of the cross beam assembly.

Details of the cross beam are shown in FIG. 7B. The cross beam assembly 602 incorporates two parallel members 704*a* and 704*b* which, for the exemplary embodiment shown are square steel tube. The first end of the cross beam assembly supported by first column 604 incorporates a fixed cross mount 706 which is rigidly attached to the parallel members and secured to the hydraulic cylinder in the first column. The second end of the cross beam assembly supported by second column 606 incorporates a slide mount assembly 708 which is secured to the hydraulic cylinder in the second column. Details of the fixed cross mount and slide mount assembly are shown in detail in FIGS. 7C, 7D and 7E.

The fixed cross mount 706, for the embodiment shown, is a square tube section welded to the parallel members adjacent the first end 710 of the cross beam assembly. As best seen in FIG. 7D, the fixed cross mount includes a hydraulic cylinder attachment roller 712 supported by depending brackets 714. Attachment roller 712 allows angular rotation between the hydraulic cylinder and fixed cross mount for angled extension of the cross beam assembly as previously described.

As best seen in FIG. 7E, the slide mount assembly 708, for the embodiment shown, includes a square tube section 716 which holds a hydraulic cylinder attachment roller 718 supported by depending brackets 720 in a similar configuration to the fixed cross mount. Side plates 722 mounted to the square tube section provide attachment points for rollers 724*a*, 724*b*, 724*c* and 724*d* which support the parallel members of the cross beam assembly. Four rollers are shown in the embodiment of the drawings for load dispersement, however, two rollers may be employed in alternative embodiments. Differential extension of the hydraulic cylinders in the first and second columns to establish a pitch angle is accommodated by translational displacement of the parallel members in the cross beam assembly through the rollers.

Support and vertical motion of the cradle is provided through suspension assemblies 614*a* and 614*b* shown in FIG. 6. As best seen in FIGS. 8A and 8B, the suspension assemblies include a brake band 802, which for the embodiment shown is a 6 mm (0.25 in) thick, 76 mm (3.00 in) wide carbon steel strip, and a suspension rod 804, which for the embodiment shown is a 160 mm (⅝ in) diameter high tensile steel rod. For the embodiment shown in the drawings, the brake band is welded to a termination cylinder 806 having an axis parallel to the brake band width, and a suspension rod attachment boss 808 into which the suspension rod is threaded.

Figure 9A:
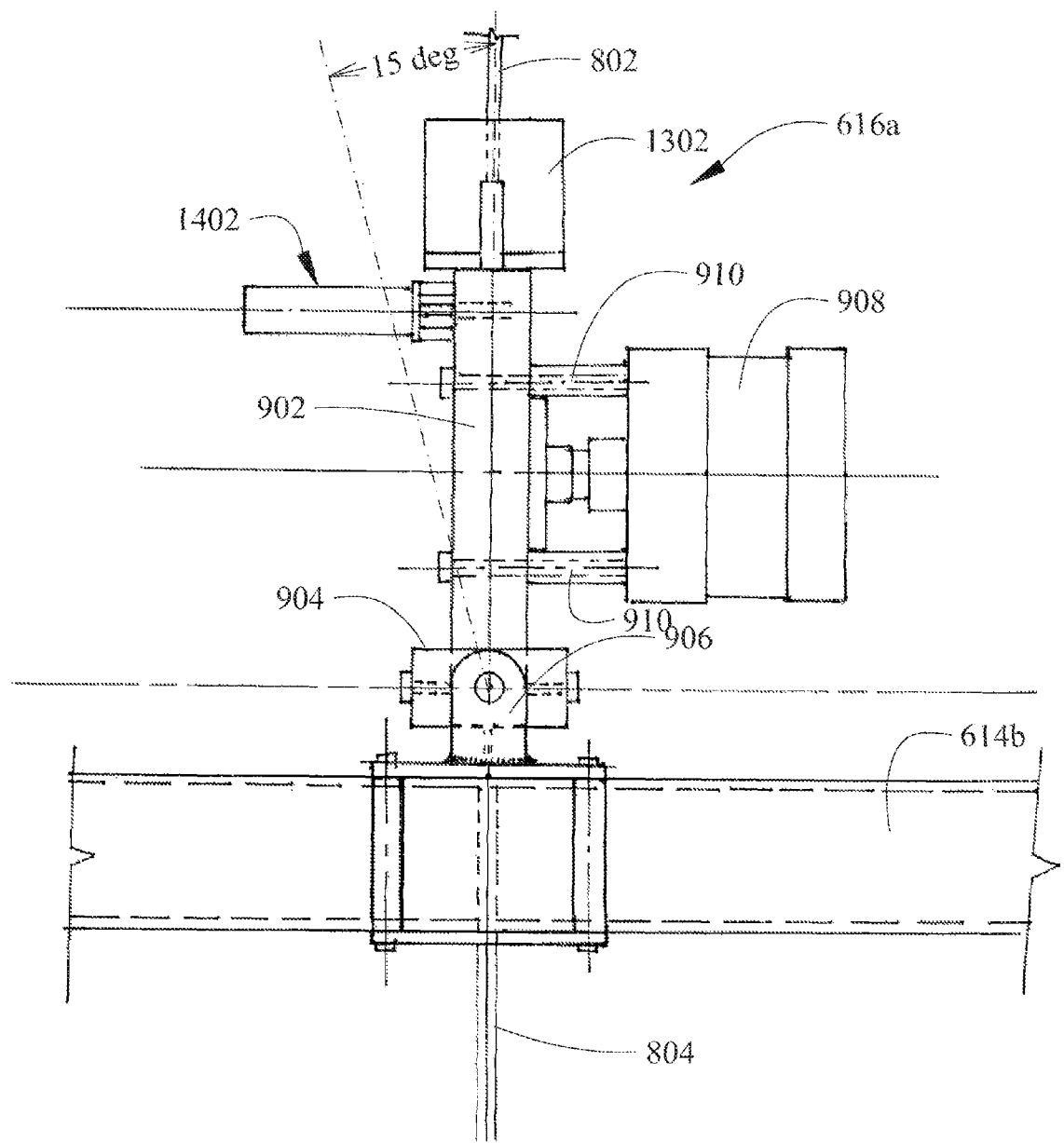
FIG. 9A is a front view of the brake assembly.
Figure 9B:
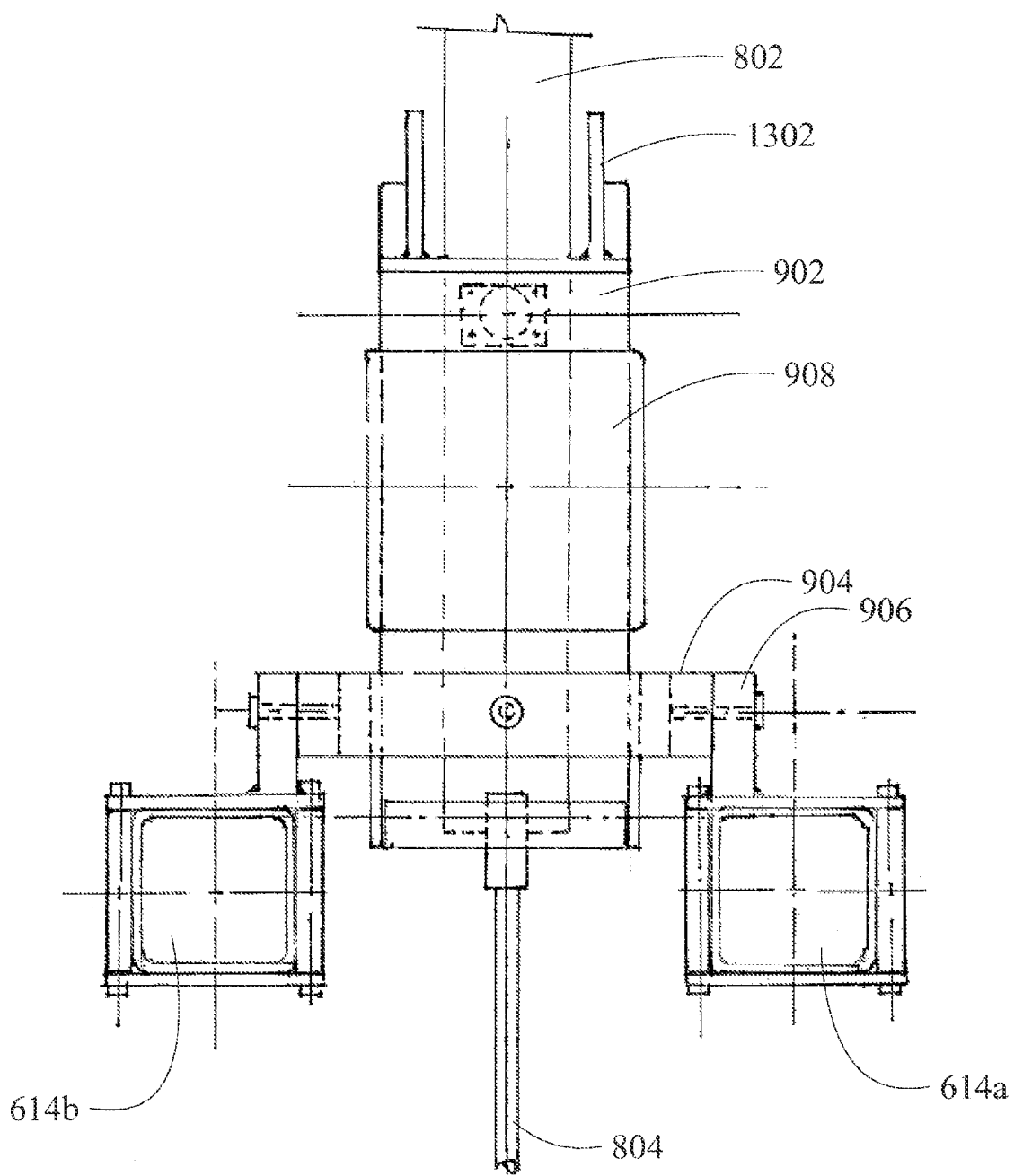
FIG. 9B is a side view of the brake assembly.

The suspension assemblies are carried in motion control assemblies 616*a* and 616*b* shown in FIG. 6. Each motion control assembly includes a trigger assembly and a brake assembly which initiate and control the drop of the cradle and test article. Details of the brake assembly are shown in FIGS. 9A and 9B. The brake assembly has a split sleeve 902 carried by a rotational bearing block 904 mounted by brackets 906*a* and 906*b* to parallel members 702*a* and 702*b*, respectively, of the cross beam assembly. Employing bolted brackets allows positioning of the motion assemblies equidistant from the cross beam center depending on length of the test article and associated cradle. The rotational bearing block in the brake assemblies allows vertical orientation of the suspension assemblies 614*a* and 614*b* (including brake bands 802 and suspension rods 804) to be maintained when the cross beam assembly is angled to provide pitch to the cradle and test article. A brake actuator 908 is attached to the sleeve with cross bolts 910 allowing plunger 912 acting on a first side of the sleeve to squeeze the split sleeve as calipers on brake band 802 For the embodiment shown, the brake actuator is pneumatic which at maximum allowable air pressure, allows the brake assembly to statically suspend a weight of 3,000 Kg.

Figure 10A:
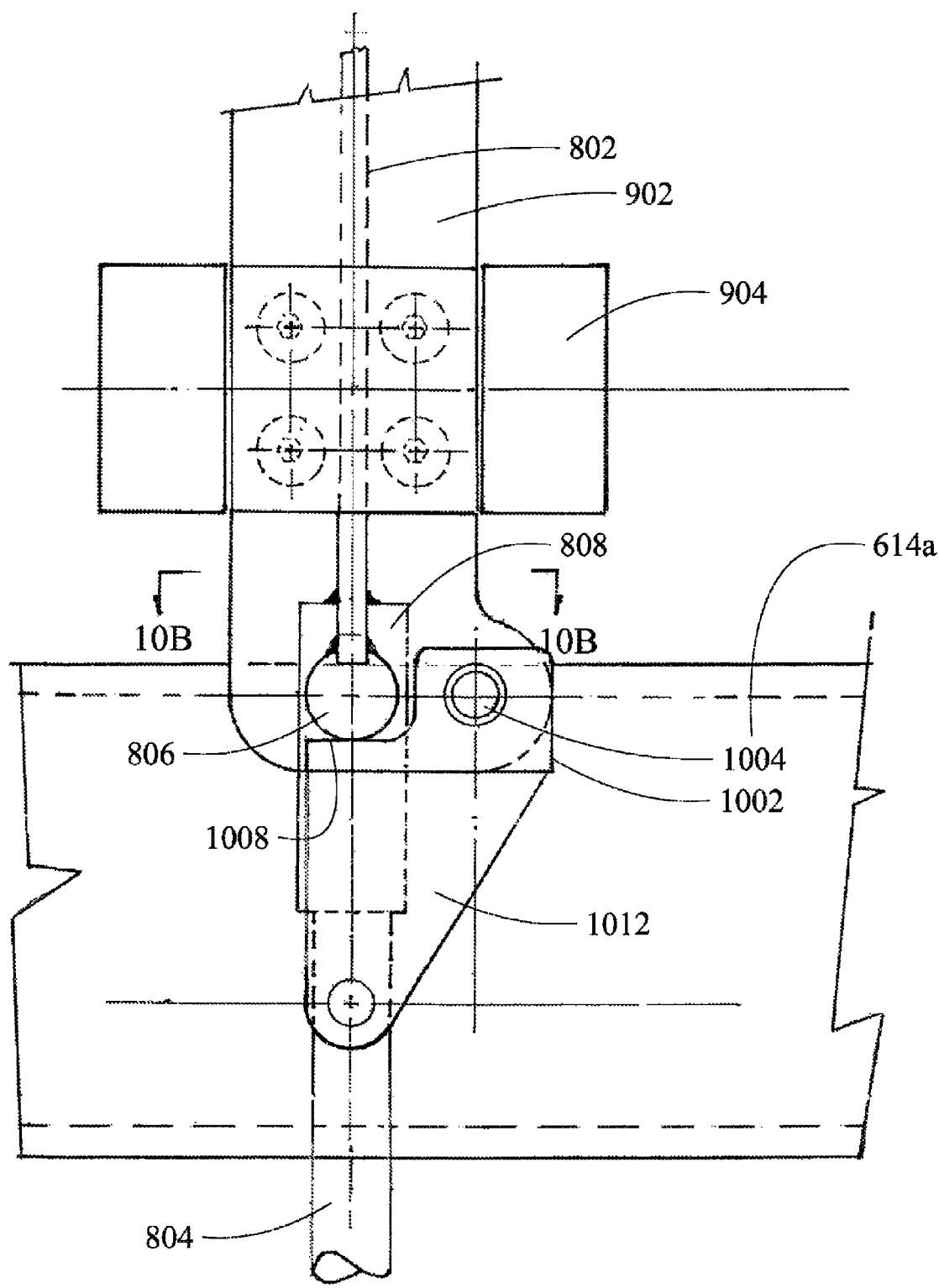
FIG. 10A is a front view of the trigger assembly.
Figure 10B:
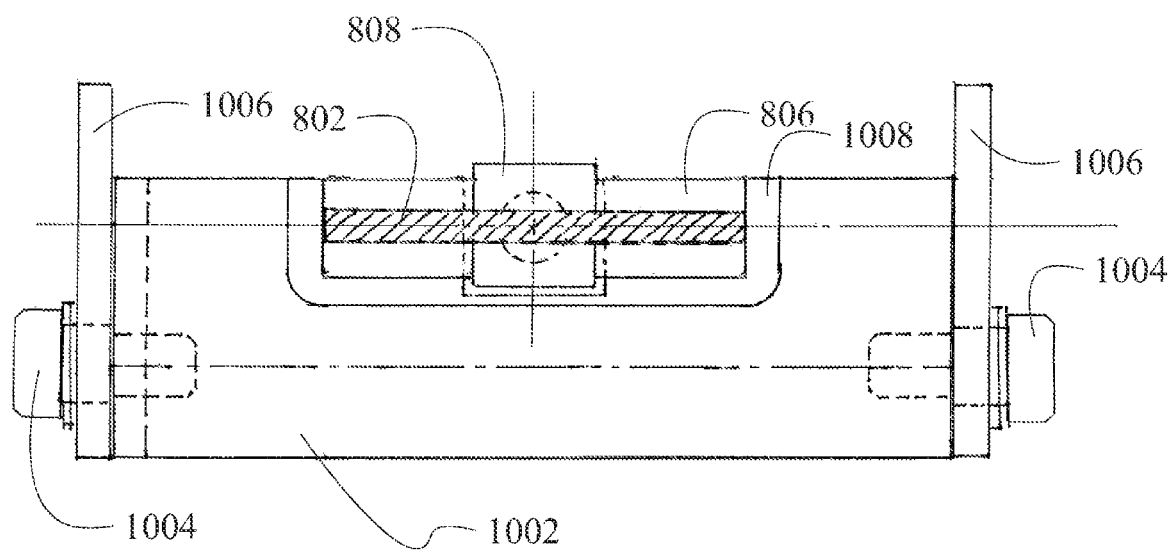
FIG. 10B is a top view of the trigger assembly.
Figure 10C:
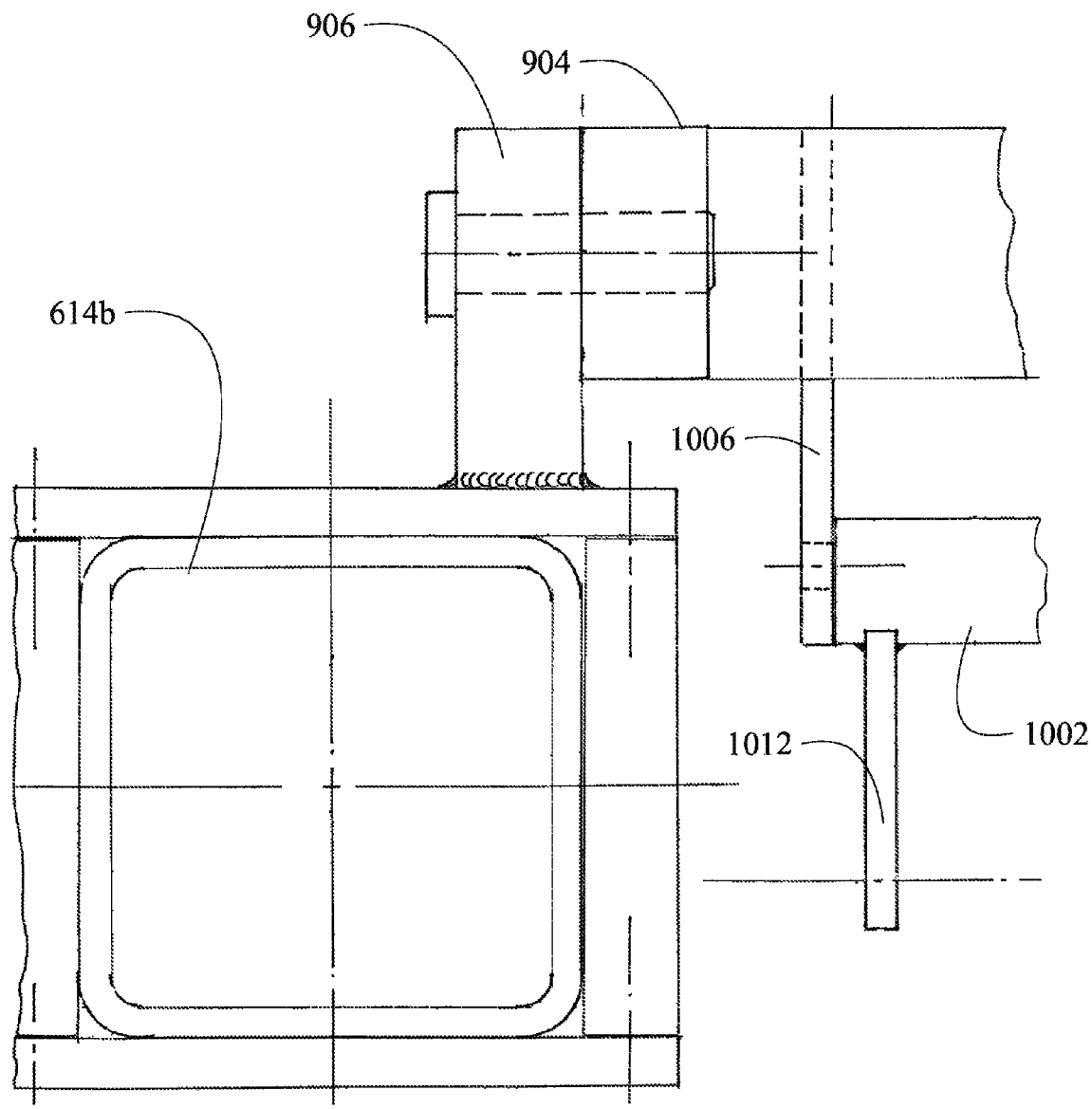
FIG. 10C is a partial side section view of the trigger assembly.

Release of the suspension assemblies to accomplish a drop of the cradle and test article is accomplished by trigger assemblies in each motion control assembly. An exemplary embodiment of the trigger assembly is shown in FIGS. 10A, 10B and 10C. A trigger cam 1002 is pivotally mounted with bolts 1004 to a bracket pair 1006 extending from rotational bearing block 904 below sleeve 902. The trigger cam incorporates a notched shelf 1008, laterally offset from the rotational connection bolt axes, on which the termination cylinder 806 of the suspension assembly rests. Notch 1010 in the shelf allows attachment boss 808 and depending suspension rod 804 to extend through the trigger assembly. Lever 1012 extends from the trigger cam to maintain the shelf in the horizontal position until released as will be described in greater detail subsequently. Upon release, the trigger cam rotates about bolts 1004 under the weight of the suspension assembly allowing shelf 1008 to rotate from under termination cylinder 806 releasing the suspension assembly for vertical translation.

Lever 1012 is restrained to hold the trigger cam with the shelf in the horizontal position by a fuse and linkage assembly 618 extending between the motion control assemblies between the parallel members of the cross beam as shown in FIG. 6. Elements of the fuse and linkage assembly are shown in detail in FIGS. 11A, 11B and 11C. Clevis plates 1102 receive and are pivotally attached to lever 1012 with bolts through holes 1104. Extension plates 1106 are received within the clevis plates and extend toward the center of the cross beam assembly. Multiple positioning holes 1108 in the clevis plates and mating holes 1110 in the extension plates allow adjustment of the linkage assembly for length of the test article and cradle. Each extension plate is supported at the center extent by a clevis 1112 which incorporates a threaded boss to receive a threaded connection rod 1114. The connection rod is threaded through a pillow block 1116 whose function will be described in greater detail subsequently.

Figure 11C:
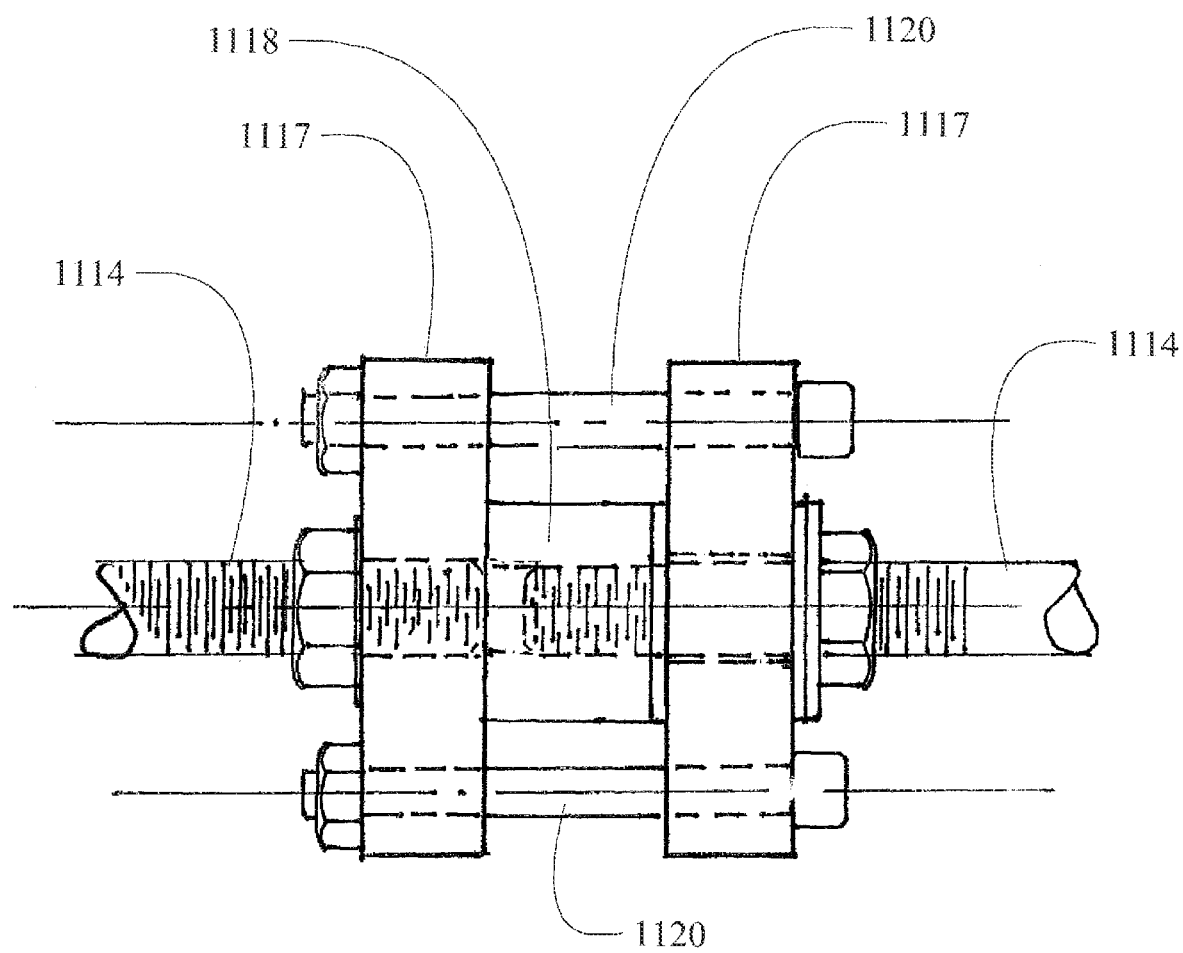
FIG. 11C is a top view of the fuse assembly.

The connection rod 1114 extends through a fuse assembly as shown in FIG. 11C. Termination blocks 1117 receive the connection rod and a fuse actuator 1118 surrounds the connection rod between the termination blocks. The fuse actuator may be a pyrotechnic device or a high current coil which melts (fuses) the connection rod at the center assuring simultaneous release the mirror linkage assemblies and trigger cams in the motion control assemblies for dropping the cradle and test article. For the embodiment shown, safety bolts 1120 may be employed to secure the termination blocks of the fuse assembly until the system is ready for use and then removed.

Figure 12A:
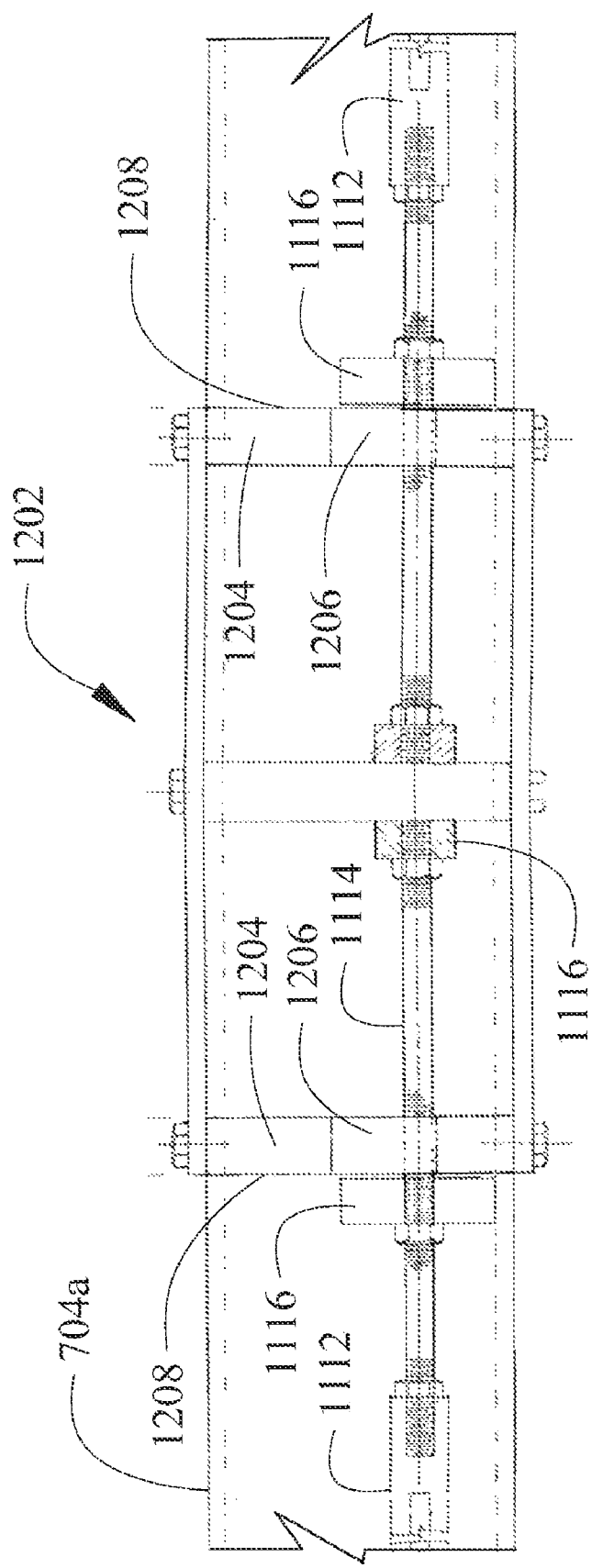
FIG. 12A is a front view of the CG equalizer assembly.
Figure 12B:
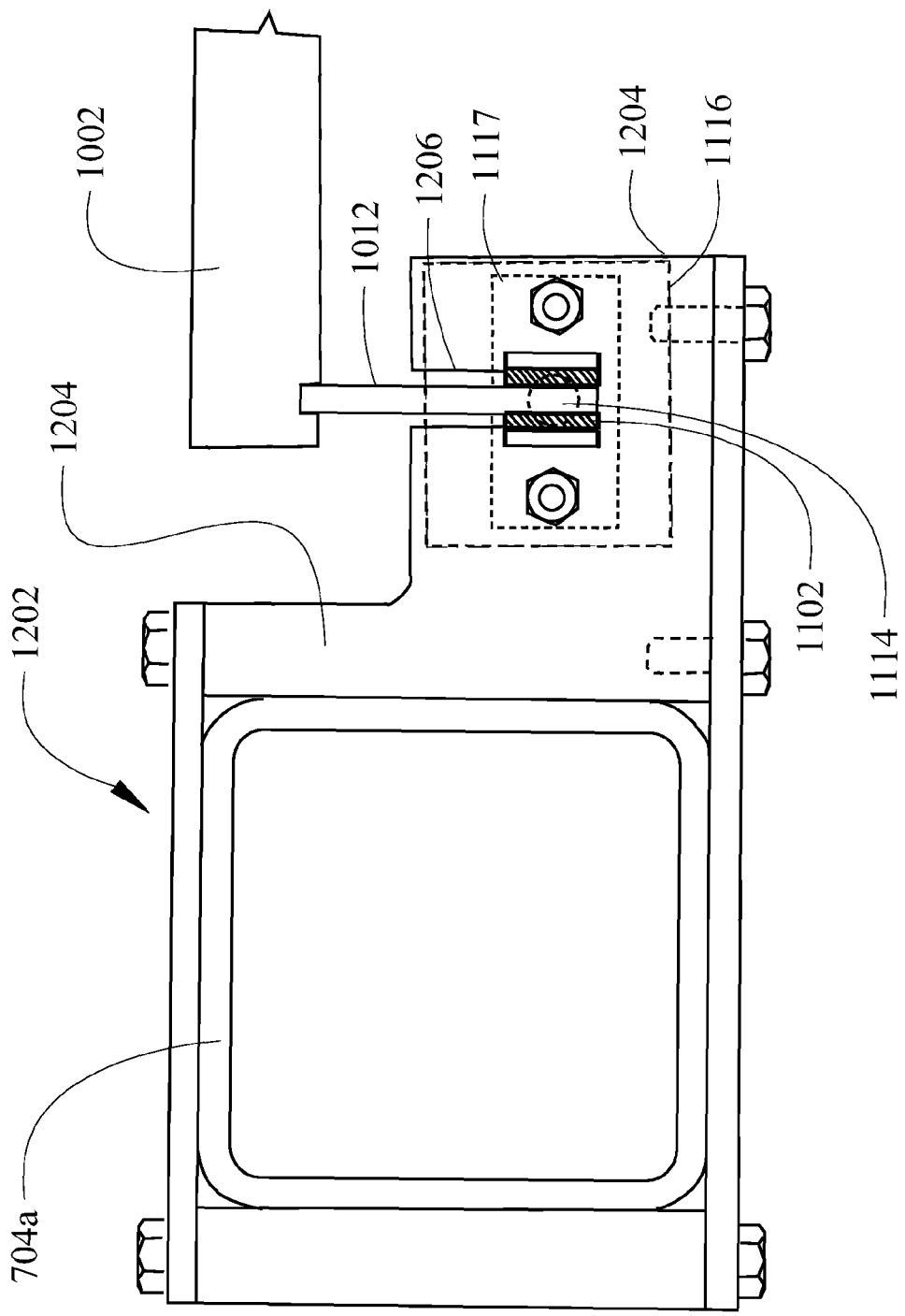
FIG. 12B is an end view of the CG equalizer assembly at line 12B-12B.

For central support of the fuse and linkage assemblies extending from the motion control assemblies and equalization of any CG shift in the test article, a CG equalizer bracket set 1202 may be employed as shown in FIGS. 12A and 12B. FIG. 12A is terminated at substantially the midline of the cross member assembly and is mirrored for the opposite side of the cross member assembly. A first structural bracket 1204 extends from one parallel cross member (for the particular configuration shown, member 704*a*) and incorporates a slot 1206 which receives connection rod 1114. Pillow block 1116 is positioned on the rod to be drawn against an opposing face 1208 of the structural bracket. Shift of the overall system CG in either direction will bring a pillow block into contact with the respective opposing face. Any movement due to load difference from the test article's inherent weight distribution is intercepted and imbalanced load is deferred to the gantry structure through the cross member assembly. A central bracket 1210 located at substantially the midline of the cross member assembly for protection of the fuse assembly.

Figure 13:
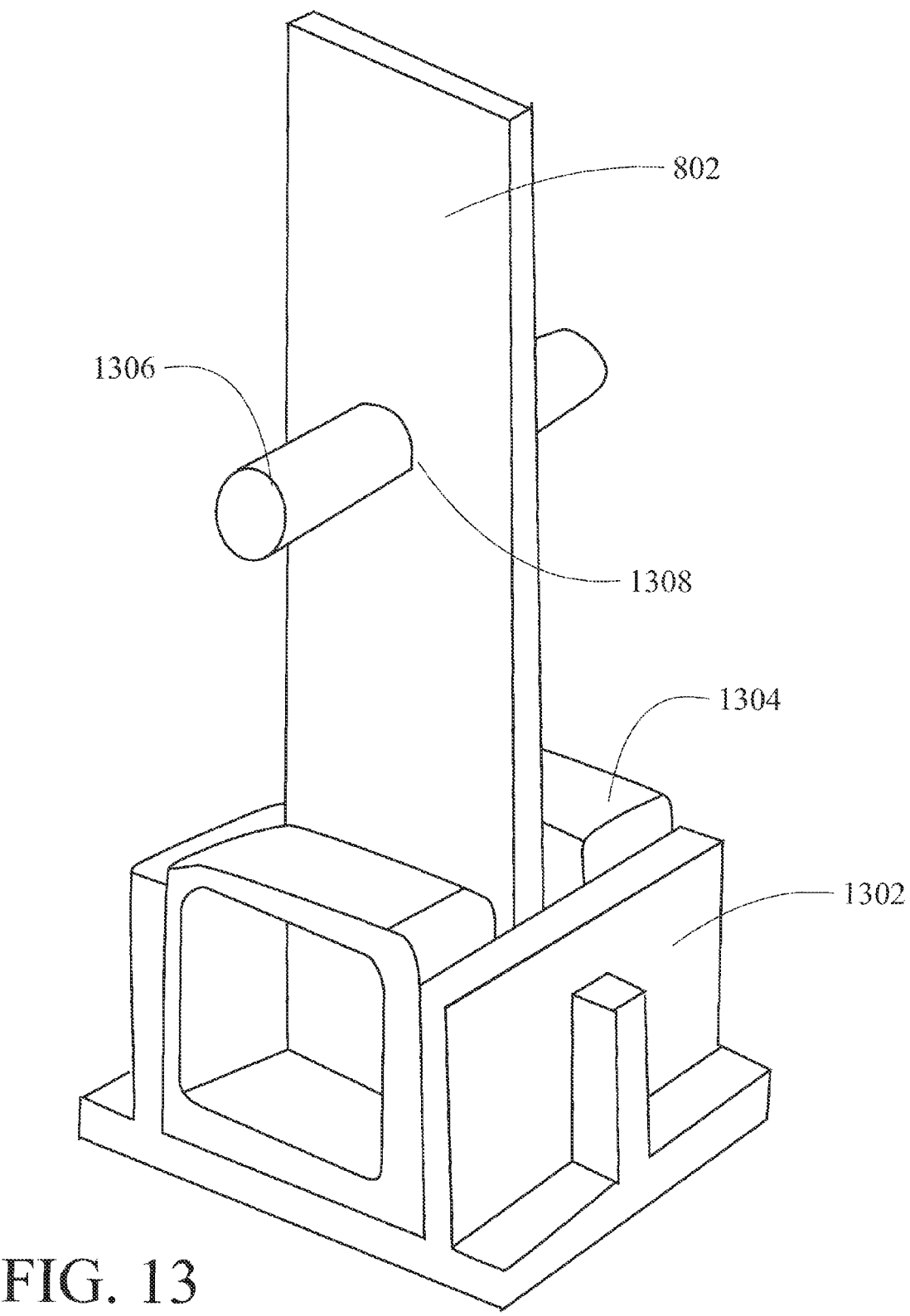
FIG. 13 is an isometric view of the service decelerator.

For calibration of the overall system with a test article loaded in the cradle but without contact on the road be surface, service decelerators may be employed as an element of the motion control assemblies. As shown in FIG. 13, the service decelerator includes a cage 1302 in which an expendable deceleration block is housed. For the embodiment shown the deceleration block is a crushable square walled tube 1304 which is slotted to receive the brake band 802 and intercepts a pin 1306 inserted through a prepositioned hole 1308 in the brake band. Positioning of the hole is determined based on the distance of vertical travel of the brake band through the motion control assembly prior to contact of the test article on the road bed. A normal drop of the cradle and test article using the fuse and linkage assembly with the trigger assembly will result in translation of the brake band through the slot in the crushable tube until contact by the inserted pin deforms (crushes) the tube to decelerate and stop the motion of the suspension assembly. The crushable tube for an exemplary embodiment is a length (15-30 mm) of square tube (100×100 mm) varying in wall thickness from 3 to 6 mm. The force profile of the crushable tube is predictable and can account for varying test article weights and weight distributions. The system is limited to a maximum of 2 g on the heaviest test article of 2,700 Kg test weight. For the embodiments shown in the drawings, the cage is mounted to the uppermost portion of the motion control assembly structure as shown in FIGS. 9A and 9B.

Figure 14:
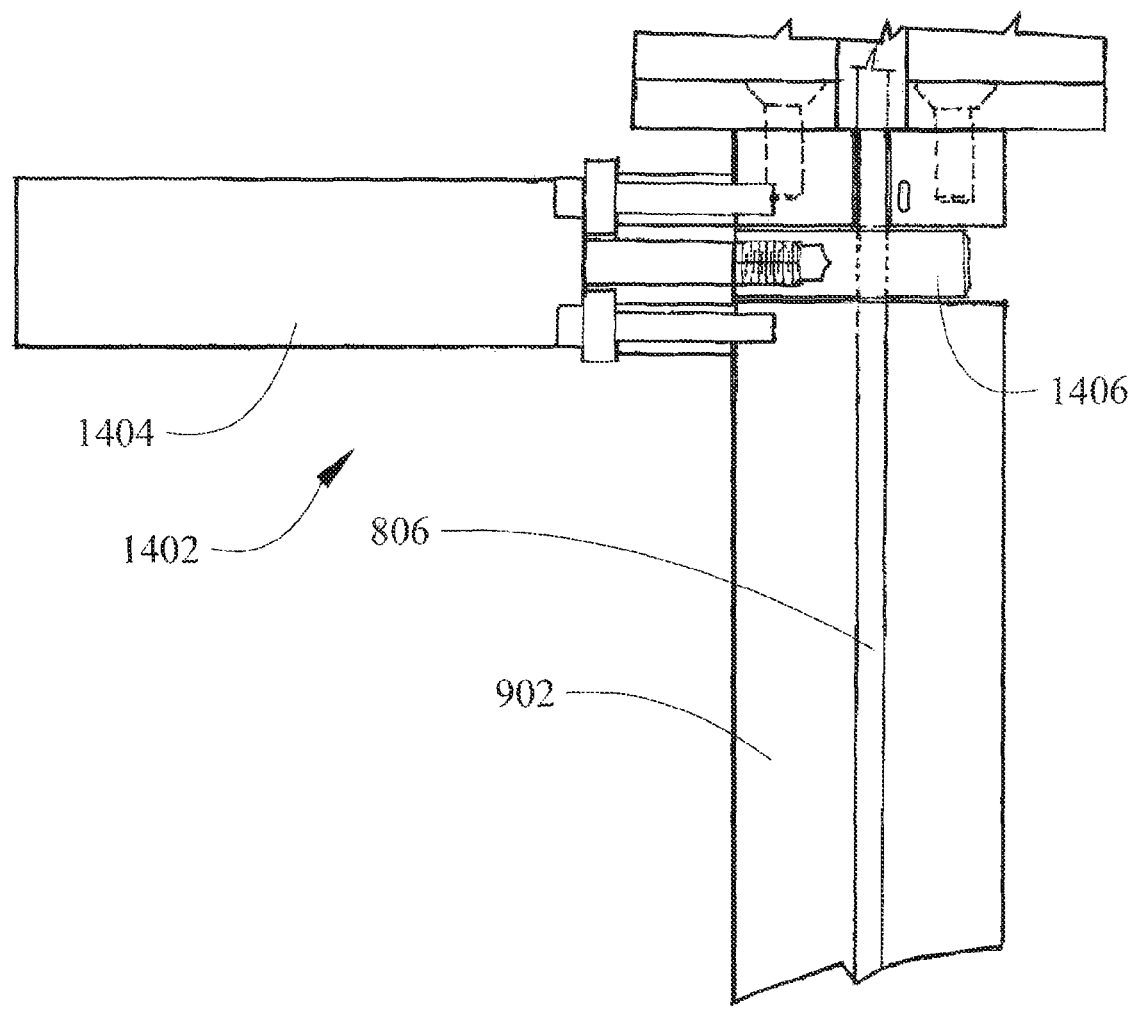
FIG. 14 is a front partial section view of the range safety.

Additionally, to preclude inadvertent operation of the system or initiation of a drop with a compromised suspension assembly, fuse and linkage assembly or trigger assembly, a range safety assembly is employed. Shown in detail in FIG. 14, the range safety assembly 1402 incorporates a hydraulic or pneumatic ram 1404 having a stroke of approximately 1 in. A safety pin 1406 connected to the ram is inserted in a safety hole 1408 in the brake band 802. The ram is extended inserting the safety pin into the brake band prior to finalizing a test article drop sequence. If the fuse assembly has prematurely severed or if the linkage assembly and trigger cams are not in proper alignment and tensioned, friction created by the shear force exerted by the brake band on the safety pin will preclude withdrawal of the safety pin by the ram thereby preventing a drop.

Figure 15A:
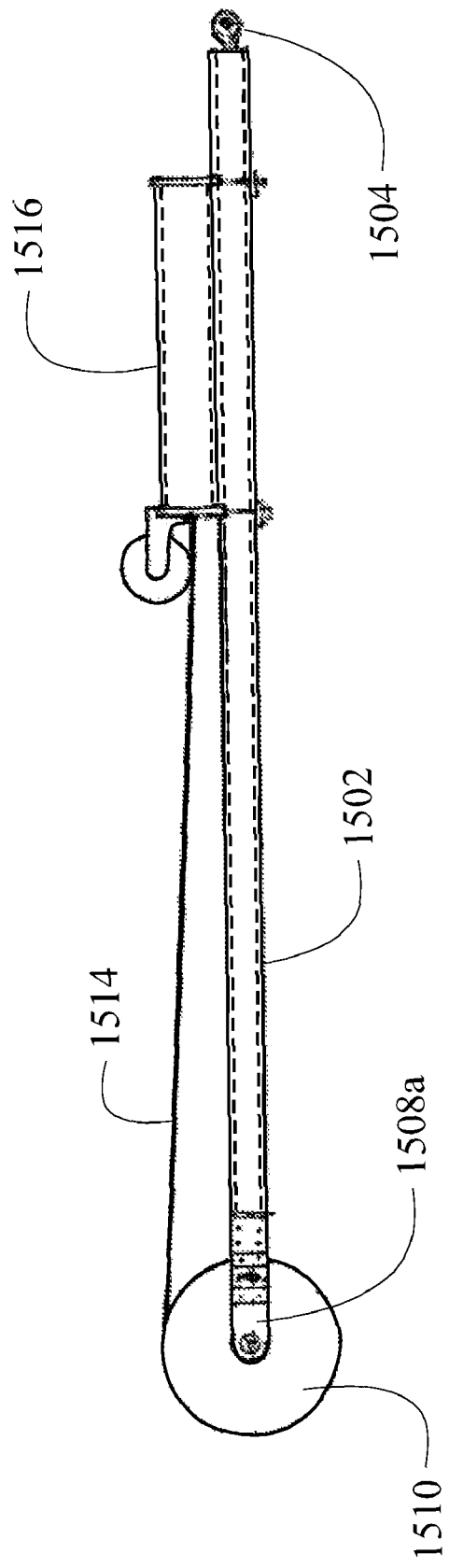
FIG. 15A is a side view of a roll control arm assembly.
Figure 15B:
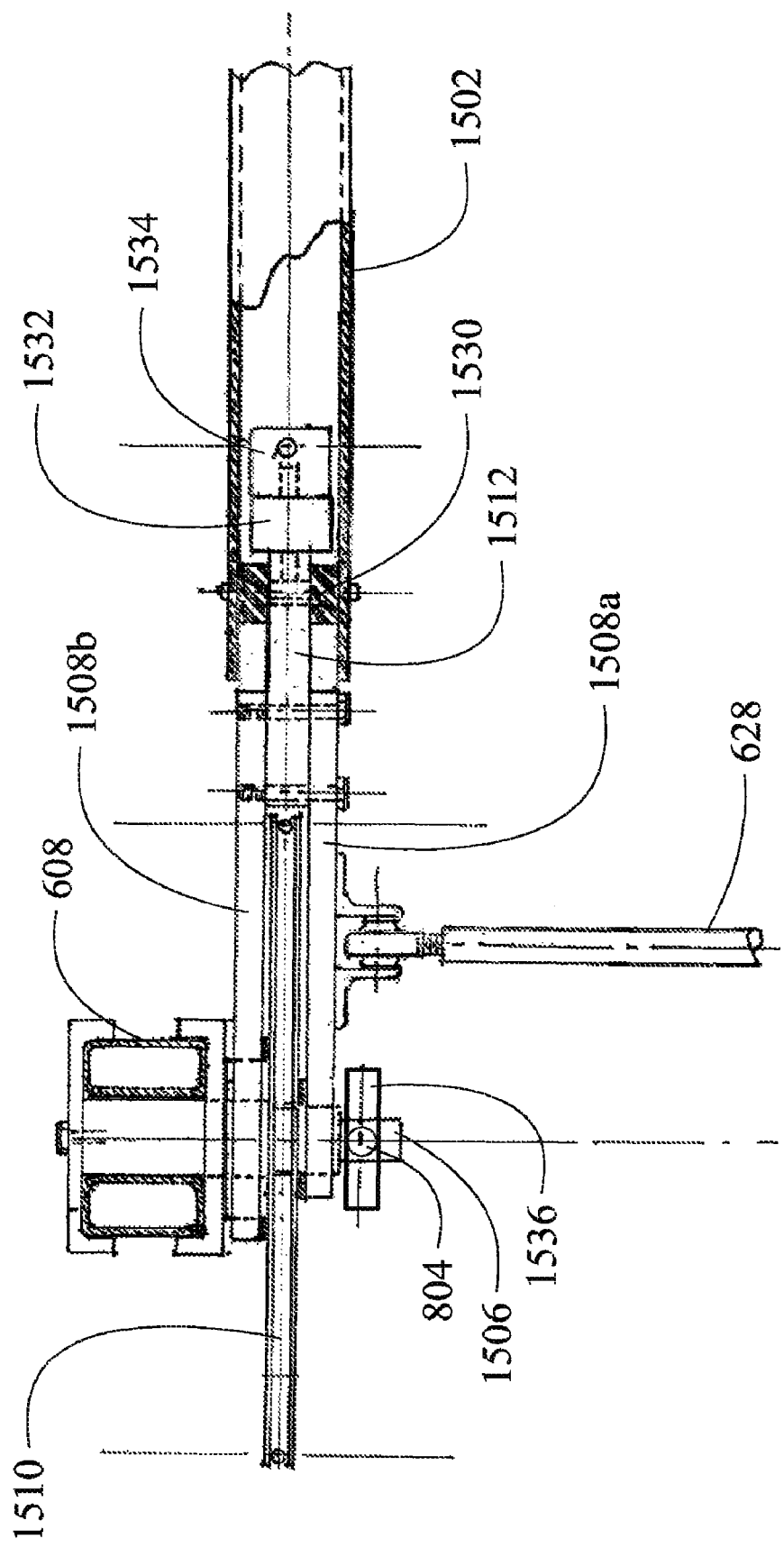
FIG. 15B is a bottom partial section view of a proximal end of the roll control arm assembly.

As with prior described embodiments, roll control of the cradle and test article is of primary importance for proper engagement of the test article with the surface of the road bed 136 carried by the test sled 110 to simulate a roll over crash event. Roll control arm assemblies 620 as seen in FIG. 6 provide control of the rolling and translation motion of the cradle and test article. Details of the roll control arm assemblies are shown in FIGS. 15A-15D. Each of the roll control arm assemblies includes a tubular control arm 1502 which terminates in a distal end fitting 1504 for connection to the flat brackets securing the roll control arm assembly to its respective reaction structure. The proximal end of the control arm provides for attachment of the cradle 608 as best seen in FIG. 15B. The cradle incorporates an extending axle 1506 which protrudes through bores with appropriate bearings in bearing plates 1508a and 1508b. A cable sheave 1510 is carried between the bearing plates for the embodiment shown and is attached to the axle with an appropriate splined bore or similar engagement to induce rotation of the cradle when the sheave is rotated. For the embodiment shown, the bearing plates are affixed to a main member 1512 extending from the tubular control arm.

Rotation of the cable sheave is created by cable 1514, best seen in FIG. 15A which extends from a propulsion cylinder 1516 described in greater detail subsequently. A control sheave 1518 accommodates substantially axial entry of the cable into the propulsion cylinder. The propulsion cylinder may be mounted to the tubular control arm with brackets allowing longitudinal placement of the propulsion cylinder along the tube for one approach to control of the power roll angle of the sheave and hence the test article and cradle. Variable cable lengths and/or cable termination position on the circumference of the sheave may alternatively be employed.

Figure 15C:
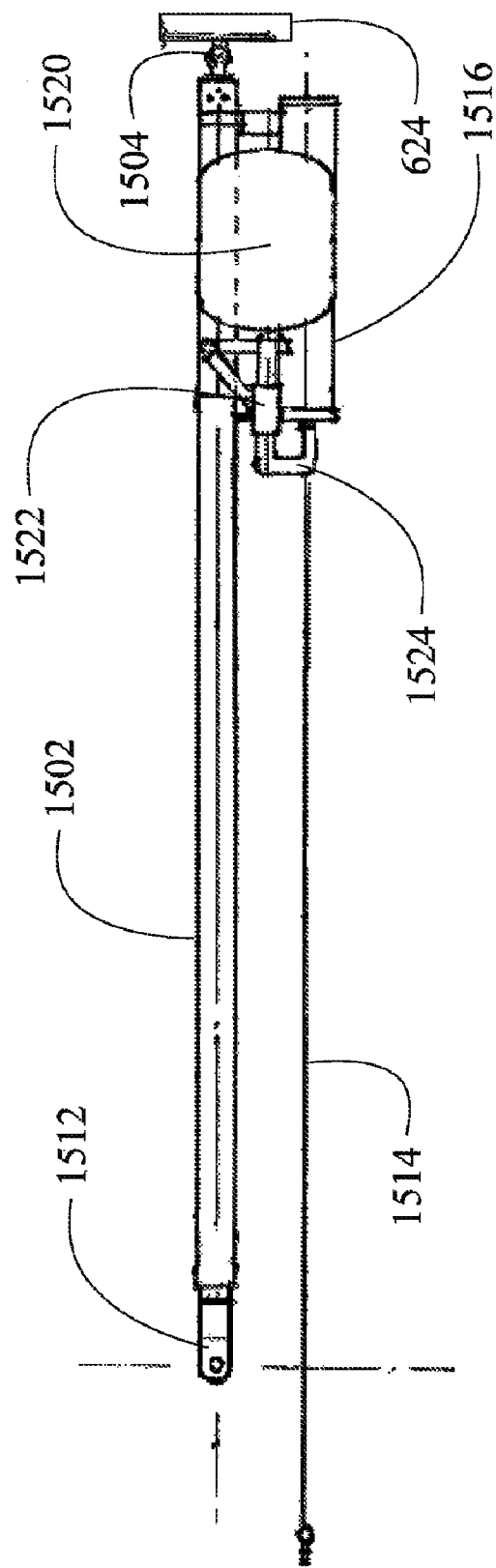
FIG. 15C is a bottom view of the roll control arm assembly showing the propulsion pneumatic system; and, FIG. 15D is a detailed view of the pneumatic system assembly.
Figure 15D:
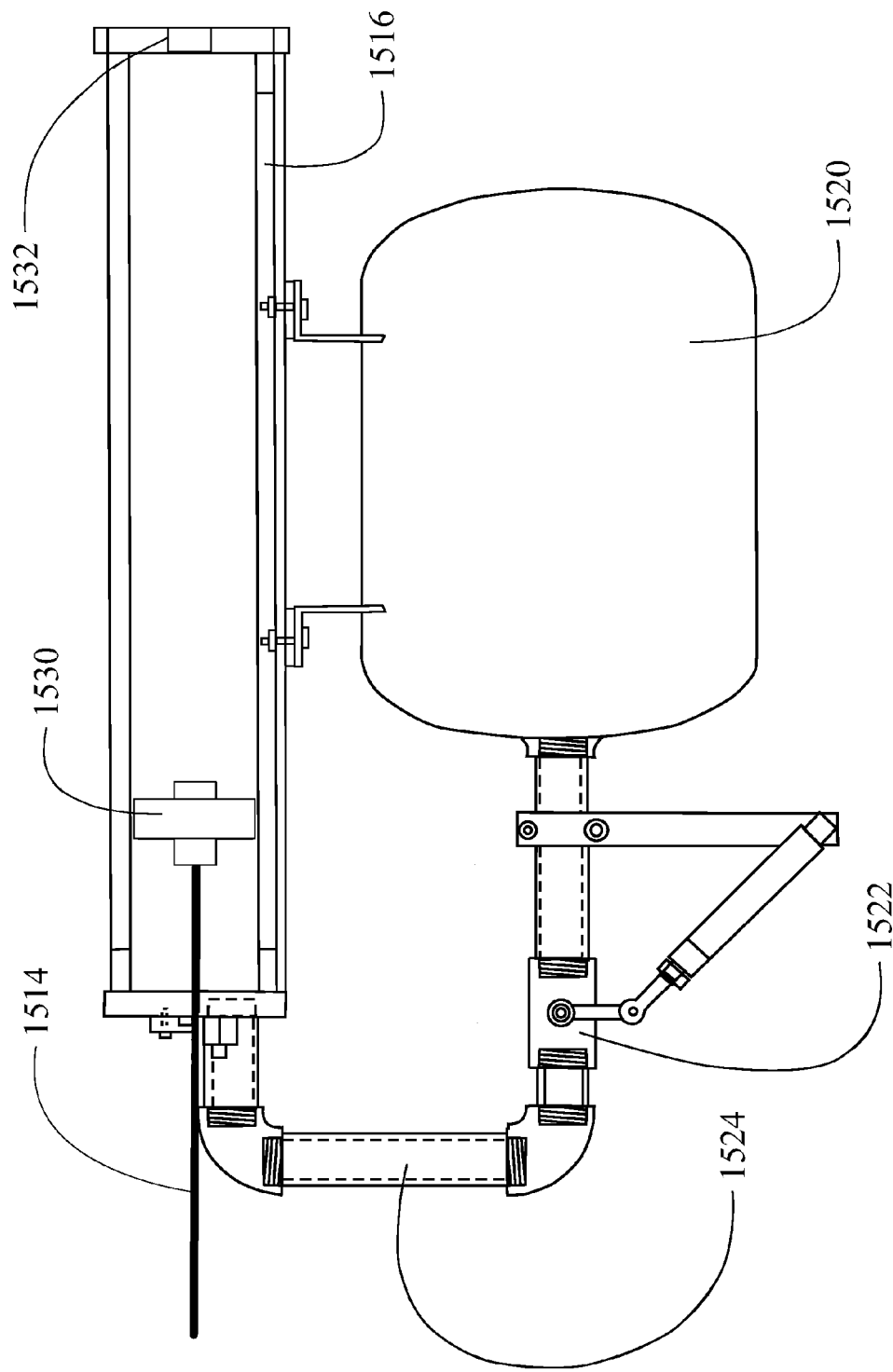

For an exemplary embodiment, the propulsion cylinder is powered by a pneumatic system assembly having a pressure tank 1520 and pneumatic valve 1522 with a manifold 1524 into a proximal end of the cylinder as best seen in FIGS. 15C and 15D. As seen in FIG. 15D, control of the valve is accomplished by a hydraulic or pneumatic ram 1526. Introduction of pressurized gas from the tank through inlet 1528 by opening of valve 1522 drives a piston 1530 connected to cable 1514 toward the distal end of cylinder 1516. Gas in the cylinder prior to actuation is exhausted through port 1532 in the distal wall of the cylinder. Pneumatic drive of the cable sheave for rotation of the cradle and test article provides reliable and consistent rotational force. Slot mounting of the terminal end of the cable in the cable sheave allows the cable to pull free at its maximum stroke thereby allowing free wheeling of the rotating cradle and test article once the desire initial angular momentum is achieved.

Returning to FIG. 15B, an exemplary installation for a portion of the vehicle reaction measurement instrumentation is shown. The sheave attachment main member 1512 is mounted to the tubular control arm through an elastomer insert 1530 to a load cell 1532 which is in turn affixed to the tubular control arm with a pivot block 1534. The suspension rods of the associated suspension assembly are rotationally attached to the extending axle 1506 with a bearing block 1536. Additionally, lateral motion of the roll control arm is constrained by a lateral control link 628 attached at a first end to the sheave clevis plate 1508a and attached at a second end to a lateral motion control bracket 630 as shown in FIG. 6

The embodiments disclosed herein provide a method of integrating crash data file analysis, experimental data and inherent features and capabilities of the embodiments to parametrically test the comparative injury performance and variability of a vehicle and dummy in the sequence of motions and impacts that constitute 90% of all serious injury real world roll-over events involving up to 8 quarter turns. The limitations of the physical structures of the prior art test apparatus made a continuous sequence of the vehicle and occupant kinematics both undesirable and impractical in a repeatable laboratory environment. However, the present embodiments can simulate the individual portions of the vehicle's kinematic sequence such that those results characterize the input conditions for the next sequence.

The research objective is to identify the injury and kinematic consequences of each segment of the complete continuous sequence of the rollover and its contribution to the initial conditions of the next segment. In combination the segments can evaluate the comparative and critical injury potential relative to other vehicles. The ability to replicate tests with high fidelity also allows evaluation of the comparative and critical injury potential with and without safety countermeasures. However, the design and regulatory objective for efficient testing is to select and use the one or two most injurious segments for comparative evaluation.

A sequence derived from National Automotive Sampling System (NASS) and Fatality Analysis Reporting System (FARS) file analysis of serious to fatal investigations, validated by experimental tests and analysis employing exemplary embodiments disclosed incorporates the segments of 1.) vehicle loss of control, 2.) yaw to trip orientation, 3.) trip, 4.) roll initiation, 5.) vehicle roof contacts with the road, 6.) roof damage, 7.) wheel contacts, 8.) suspension rebound and lofting for a second roll, 9.) roof and wheel contact to rest. The variability of each segment as it affects the next, must be evaluated parametrically. The embodiments disclosed have the additional capability of providing a basis for evaluating the dummy injury consequences of each segment (except roof crush) parametrically without damaging the vehicle. Using the embodiments disclosed the sequence steps may be evaluated as follows.

The loss of control and the effect of Electronic Stability Control (ESC) can be evaluated on the sled or tow motor which propels the roadbed by alternatively moving the subject vehicle with limited lateral displacement as a result of cyclic incremental steering inputs.

Yaw to trip can be simulated by mounting the test article vehicle with dummy or human occupants on the roadbed at 60° or 90° (or variably) to the direction of travel, accelerating to speed and then braking at 0.7 Gs (the lateral tire patch coefficient of friction) to identify the kinematic and injury consequences to the dummy and/or human with and without timely activated protective devices. Preliminary tests put the near side occupant hard against the door and side window and the far side occupant out of the shoulder belt and lying across the seat and forward to the extent allowed by the mid seat console prior to protective activation. These tests in turn set the initial out-of-position conditions of the occupants for the trip.

Wheel or curb trip result in a short duration increased lateral load with the occupants already hard in the belts. With the vehicle, wheels, tires and suspension in the gantry, a wheel or curb trip to initial roll and roll rate can be simulated. Preliminary tests do not indicate any significant change in occupant position or injury potential.

Initial portion of the roll can be estimated to increase from 30° to 190° to 270°/sec. by near side roof touch down at 125° to 145° after a 4" or more drop.

At vehicle roof contact with the road, occupant kinematics and injury potential can be parametrically simulated at alternate roll rates and drop heights to the near and far side, without roof crush and with or without protective devices by limiting the drop height with the brake system or service decelerators.

Roof damage and both the near and far side roof crush consequences can then be evaluated by dynamic impact measurements inside, by laser survey of the exterior and by dummy injury criteria.

Wheel contacts on the far and then the near side may be directly observed by placing the wheels and tires on the suspended hubs of the test article as held in the cradle and rotating them into the roadbed surface at the angular rates and traveling speed of the far side roof contact. The far side contact will slow the rotation rate.

Suspension rebound and lofting for a second roll, occurs when the near side wheels contact, further slowing the rotation rate by compressing the suspension and on rebound lifting (lofting) the vehicle to a touchdown on the near side roof rail. The ballistic trajectory from the suspension lift determines the rotation rate drop height and touchdown angle of the near side roof rail in the second roll.

Second roll roof and wheel contact to rest with the consequences of the roof and wheel impacts can be evaluated as in segments 5 and 6.

An exemplary test for evaluation of the various segments of the crash sequence can be accomplished using the disclosed embodiments. A test article is inserted into the cradle which is rotated in the gantry to an initial yaw angle and rotated about the roll axis of the cradle to a calculated position where full roll rate will be achieved with initial impact angle upon contact with the road bed. The road bed is then launched at initial horizontal speed and roll of the cradle and test article using the roll control arms is initiated to achieve desired roll rate based on calculation to road bed impact point. The suspension assembly is then triggered to drop the cradle and test article for road bed impact at a target location and the roll control arms are free wheeled. Instrumentation then monitors for the maximum rebound of the cradle/test article which is then arrested by the brake assembly at apogee. The road bed is then reset and initial conditions are defined for roll 2 simulation including yaw angle, roll rate, impact angle and horizontal speed. The cradle to is rotated to the $2^{nd}$ roll yaw angle and about its roll axis to a calculated position where full roll rate will be achieved with $2^{nd}$ roll initial impact angle upon contact with the road bed. The road bed is then launched at the at $2^{nd}$ roll initial horizontal speed. Roll of the cradle and test article is again accomplished using the roll control arms to achieve desired roll rate based on calculation to road bed impact point. The suspension assembly is then triggered to drop the cradle and test article for road bed impact at target location and the roll control arms are free wheeled. Instrumentation again monitors for the maximum rebound of the cradle/test article which is then arrested by the brake assembly at apogee.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A test fixture for rollover crash testing of a test vehicle onto a movable sled having a contact surface and carried by bearings on a guide said fixture comprising:
   a cradle to support and rotate a test vehicle;
   a suspension assembly attached to each end of the cradle for vertically supporting and dropping the cradle;
   a structure having a cross beam supported by a first telescoping column for support of a first of the suspension assemblies and translationally supported by a second telescoping column for support of a second of the suspension assemblies to position and releasably hold the suspension assembly;
   roll control arms for rotating the cradle;
   a trigger assembly for releasing the cradle and test vehicle from the structure responsive to a sensing means for contact within a drop impact zone on the contact surface of the sled; and
   a vertical brake assembly engaging the suspension assembly, said brake assembly actuated by a sensing element.

2. The apparatus of claim 1 wherein the vertical brake assembly comprises a brake actuator squeezing a split sleeve on a brake band in the suspension assembly.

3. The apparatus of claim 1 wherein the roll control arms incorporate a cable sheave connected to the cradle and a piston driven cable rotating the cable sheave.

4. The apparatus of claim 2 wherein the suspension assembly comprises the brake band extending from a suspension rod, said suspension rod connected to the cradle.

5. The apparatus of claim 1 wherein the trigger assembly comprises a fused linkage centrally interconnecting trigger earns releaseably supporting each suspension assembly.

6. The apparatus of claim 1 further comprising a service decelerator.

7. The apparatus of claim 1 further comprising a range safety assembly.

8. The apparatus of claim 3 wherein the piston is pneumatically driven.

9. The apparatus of claim 5 wherein the fused linkage assembly comprises mirroring clevis plates connecting to lever arms extending from the trigger cams associated with each suspension assembly, said clevis plates connected through an extension plate to a connecting rod, said connecting rod fusible by a fuse actuator selected from a pyrotechnic device or a high current coil.

10. A method for crash testing of a test vehicle or representation thereof onto a moving surface comprising the steps of:
   providing a cradle to support and position a test vehicle component above a sled path;
   suspending the cradle from a gantry;
   providing a sled on the path onto which the test vehicle is dropped in synchronous coordination;
   rotating the cradle with a cable sheave to establish a predetermined angular momentum and position the test vehicle for impact onto the impact zone on the sled;
   triggering the drop of the test vehicle at a specific time with respect to an angular position of the test vehicle; and,
   isolating the test vehicle from additional impacts after the desired impact or impacts.

11. The method of claim 10 wherein the step of rotating the cradle with a cable sheave includes pneumatically driving a piston drawing a cable from the cable sheave to rotate the cradle.

12. The method of claim 10 further comprising the step of selectively setting positional parameters of the test vehicle including pitch angle, yaw angle, roll angle, roll rate, drop height and position of impact on the contact surface.

13. The method of claim 10 wherein the step of triggering the drop comprises fusing a link to simultaneously release trigger assemblies supporting a suspension assembly suspending the cradle.

14. The method of claim 10 further comprising the step of setting moments of inertia of the test vehicle by means of adjusting ballast weights to the vehicle support cradle or to the test vehicle.

15. A method for vehicle crash testing comprising:
   inserting a test article vehicle into a cradle suspending the cradle in a motion control system;
   rotating the cradle to initial yaw angle and rotating the cradle with the test article to a calculated position where full roll rate will be achieved with initial impact angle upon contact with the road bed;
   launching a road bed at initial horizontal speed;
   initiating roll of the cradle and test article using a roll control arm to achieve desired roll rate based on calculation to road bed impact point;
   dropping the cradle for road bed impact at target location and free wheel roll control arm;
   monitoring for maximum rebound of cradle and test article and arrest at apogee with a brake assembly;
   resetting the road bed;
   defining initial conditions for roll 2 simulation including yaw angle, roll rate, impact angle and horizontal speed;
   rotating the cradle to $2^{nd}$ roll yaw angle and rotating the cradle test article to a calculated position where full roll rate will be achieved with $2^{nd}$ roll initial impact angle upon contact with the road bed;
   launching the road bed at $2^{nd}$ roll initial horizontal speed initiating roll of the cradle and test article using the roll control aim to achieve desired roll rate based on calculation to road bed impact point;
   dropping the cradle for road bed impact by the test article at target location and free wheel the roll control arm;
   monitoring for maximum rebound of cradle and test article and arresting at apogee.

* * * * *